United States Patent
Funk et al.

(10) Patent No.: US 11,061,874 B1
(45) Date of Patent: Jul. 13, 2021

(54) SYSTEMS AND METHODS FOR RESOLVING ENTITY DATA ACROSS VARIOUS DATA STRUCTURES

(71) Applicant: Palantir Technologies Inc., Palo Alto, CA (US)

(72) Inventors: Benjamin Funk, London (GB); Emanuel Ferm, London (GB); Nikola Chonkov, New York, NY (US)

(73) Assignee: Palantir Technologies Inc., Denver, CO (US)

( * ) Notice: Subject to any disclaimer, the term of this patent is extended or adjusted under 35 U.S.C. 154(b) by 153 days.

(21) Appl. No.: 15/955,475

(22) Filed: Apr. 17, 2018

Related U.S. Application Data

(60) Provisional application No. 62/598,815, filed on Dec. 14, 2017.

(51) Int. Cl.
*G06F 16/215* (2019.01)
*G06F 16/25* (2019.01)
(Continued)

(52) U.S. Cl.
CPC ........ *G06F 16/215* (2019.01); *G06F 16/2365* (2019.01); *G06F 16/2468* (2019.01);
(Continued)

(58) Field of Classification Search
CPC .................................................... G06F 16/215
See application file for complete search history.

(56) References Cited

U.S. PATENT DOCUMENTS

| | | |
|---|---|---|
| 4,881,179 A | 11/1989 | Vincent |
| 5,241,625 A | 8/1993 | Epard et al. |

(Continued)

FOREIGN PATENT DOCUMENTS

| | | |
|---|---|---|
| AU | 2013251186 | 11/2015 |
| AU | 2014203669 | 5/2016 |

(Continued)

OTHER PUBLICATIONS

"A Tour of Pinboard," <http://pinboard.in/tour> as printed May 15, 2014 in 6 pages.
(Continued)

*Primary Examiner* — Van H Oberly
(74) *Attorney, Agent, or Firm* — Knobbe, Martens, Olson & Bear, LLP

(57) ABSTRACT

Computer implemented systems and methods resolve data entries across multiple lists. The lists may include a plurality of records, wherein each record is associated with a respective entity. In accordance with some embodiments, the systems and methods further comprise identifying a direct field match between two lists, determining updated lists based on the remaining data entries, executing a comparison of the remaining data entries, determining a scoring metric based on the comparison, and determining whether the scoring metric exceeds a threshold. The systems and methods further comprise generating a data distribution curve based on the matched and unmatched data records and adjusting the threshold based on the data distribution curve for the next iteration of comparisons executed on the remaining unresolved entities.

19 Claims, 7 Drawing Sheets

(51) Int. Cl.
*G06F 16/23* (2019.01)
*G06F 16/2458* (2019.01)
*G06F 16/2455* (2019.01)
*G06F 16/903* (2019.01)

(52) U.S. Cl.
CPC ...... *G06F 16/24556* (2019.01); *G06F 16/258* (2019.01); *G06F 16/90344* (2019.01)

(56) References Cited

U.S. PATENT DOCUMENTS

| | | |
|---|---|---|
| 5,826,021 A | 10/1998 | Mastors et al. |
| 5,832,218 A | 11/1998 | Gibbs et al. |
| 5,845,300 A | 12/1998 | Comer |
| 5,878,434 A | 3/1999 | Draper et al. |
| 5,897,636 A | 4/1999 | Kaeser |
| 5,966,706 A | 10/1999 | Biliris et al. |
| 5,999,911 A | 12/1999 | Berg et al. |
| 6,006,242 A | 12/1999 | Poole et al. |
| 6,057,757 A | 5/2000 | Arrowsmith et al. |
| 6,065,026 A | 5/2000 | Cornelia et al. |
| 6,101,479 A | 8/2000 | Shaw |
| 6,134,582 A | 10/2000 | Kennedy |
| 6,232,971 B1 | 5/2001 | Haynes |
| 6,237,138 B1 | 5/2001 | Hameluck et al. |
| 6,243,706 B1 | 6/2001 | Moreau et al. |
| 6,243,717 B1 | 6/2001 | Gordon et al. |
| 6,279,018 B1 | 8/2001 | Kudrolli et al. |
| 6,370,538 B1 | 4/2002 | Lamping et al. |
| 6,430,305 B1 | 8/2002 | Decker |
| 6,463,404 B1 | 10/2002 | Appleby |
| 6,519,627 B1 | 2/2003 | Dan et al. |
| 6,523,019 B1 | 2/2003 | Borthwick |
| 6,642,945 B1 | 11/2003 | Sharpe |
| 6,665,683 B1 | 12/2003 | Meltzer |
| 6,850,317 B2 | 2/2005 | Mullins et al. |
| 6,944,777 B1 | 9/2005 | Belani et al. |
| 6,944,821 B1 | 9/2005 | Bates et al. |
| 6,967,589 B1 | 11/2005 | Peters |
| 6,978,419 B1 | 12/2005 | Kantrowitz |
| 7,058,648 B1 | 6/2006 | Lightfoot et al. |
| 7,086,028 B1 | 8/2006 | Davis et al. |
| 7,174,377 B2 | 2/2007 | Bernard et al. |
| 7,194,680 B1 | 3/2007 | Roy et al. |
| 7,213,030 B1 | 5/2007 | Jenkins |
| 7,392,254 B1 | 6/2008 | Jenkins |
| 7,403,942 B1 | 7/2008 | Bayliss |
| 7,441,182 B2 | 10/2008 | Beilinson et al. |
| 7,441,219 B2 | 10/2008 | Perry et al. |
| 7,461,158 B2 | 12/2008 | Rider et al. |
| 7,627,489 B2 | 12/2009 | Schaeffer et al. |
| 7,627,812 B2 | 12/2009 | Chamberlain et al. |
| 7,634,717 B2 | 12/2009 | Chamberlain et al. |
| 7,716,140 B1 | 5/2010 | Nielsen et al. |
| 7,739,246 B2 | 6/2010 | Mooney et al. |
| 7,757,220 B2 | 7/2010 | Griffith et al. |
| 7,765,489 B1 | 7/2010 | Shah |
| 7,770,100 B2 | 8/2010 | Chamberlain et al. |
| 7,877,421 B2 | 1/2011 | Berger et al. |
| 7,880,921 B2 | 2/2011 | Dattilo et al. |
| 7,912,842 B1 | 3/2011 | Bayliss |
| 7,941,336 B1 | 5/2011 | Robin-Jan |
| 7,958,147 B1 | 6/2011 | Turner et al. |
| 7,962,495 B2 | 6/2011 | Jain et al. |
| 7,962,848 B2 | 6/2011 | Bertram |
| 7,966,199 B1 | 6/2011 | Frasher |
| 8,001,465 B2 | 8/2011 | Kudrolli et al. |
| 8,001,482 B2 | 8/2011 | Bhattiprolu et al. |
| 8,010,507 B2 | 8/2011 | Poston et al. |
| 8,073,857 B2 | 12/2011 | Sreekanth |
| 8,117,022 B2 | 2/2012 | Linker |
| 8,126,848 B2 | 2/2012 | Wagner |
| 8,191,005 B2 | 5/2012 | Baier et al. |
| 8,225,201 B2 | 7/2012 | Michael |
| 8,290,838 B1 | 10/2012 | Thakur et al. |
| 8,302,855 B2 | 11/2012 | Ma et al. |
| 8,312,367 B2 | 11/2012 | Foster |
| 8,364,642 B1 | 1/2013 | Garrod |
| 8,386,377 B1 | 2/2013 | Xiong et al. |
| 8,392,556 B2 | 3/2013 | Goulet et al. |
| 8,417,715 B1 | 4/2013 | Bruckhaus et al. |
| 8,429,527 B1 | 4/2013 | Arbogast |
| 8,527,949 B1 | 9/2013 | Pleis et al. |
| 8,554,719 B2 | 10/2013 | McGrew |
| 8,601,326 B1 | 12/2013 | Kirn |
| 8,620,641 B1 | 12/2013 | Farnsworth et al. |
| 8,639,552 B1 | 1/2014 | Chen et al. |
| 8,682,696 B1 | 3/2014 | Shanmugam |
| 8,688,573 B1 | 4/2014 | Ruknoic et al. |
| 8,732,574 B2 | 5/2014 | Burr et al. |
| 8,798,354 B1 | 8/2014 | Bunzel et al. |
| 8,799,313 B2 | 8/2014 | Satlow |
| 8,807,948 B2 | 8/2014 | Luo et al. |
| 8,812,444 B2 | 8/2014 | Garrod et al. |
| 8,838,538 B1 | 9/2014 | Landau et al. |
| 8,855,999 B1 | 10/2014 | Elliot |
| 8,903,717 B2 | 12/2014 | Elliot |
| 8,924,388 B2 | 12/2014 | Elliot et al. |
| 8,924,389 B2 | 12/2014 | Elliot et al. |
| 8,930,874 B2 | 1/2015 | Duff et al. |
| 8,938,434 B2 | 1/2015 | Jain et al. |
| 8,938,686 B1 | 1/2015 | Erenrich et al. |
| 8,984,390 B2 | 3/2015 | Aymeloglu et al. |
| 9,058,315 B2 | 6/2015 | Burr et al. |
| 9,105,000 B1 | 8/2015 | White et al. |
| 9,165,100 B2 | 10/2015 | Begur et al. |
| 9,230,060 B2 | 1/2016 | Friedlander et al. |
| 9,286,373 B2 | 3/2016 | Elliot et al. |
| 9,348,499 B2 | 5/2016 | Aymeloglu et al. |
| 9,348,851 B2 | 5/2016 | Kirn |
| 9,348,880 B1 | 5/2016 | Kramer et al. |
| 2001/0021936 A1 | 9/2001 | Bertram |
| 2002/0032677 A1 | 3/2002 | Morgenthaler et al. |
| 2002/0035590 A1 | 3/2002 | Eibach et al. |
| 2002/0095360 A1 | 7/2002 | Joao |
| 2002/0103705 A1 | 8/2002 | Brady |
| 2002/0194058 A1 | 12/2002 | Eldering |
| 2002/0196229 A1 | 12/2002 | Chen et al. |
| 2003/0028560 A1 | 2/2003 | Kudrolli et al. |
| 2003/0036927 A1 | 2/2003 | Bowen |
| 2003/0061132 A1 | 3/2003 | Mason et al. |
| 2003/0074187 A1 | 4/2003 | Ait-Mokhtar et al. |
| 2003/0088438 A1 | 5/2003 | Maughan et al. |
| 2003/0093401 A1 | 5/2003 | Czahkowski et al. |
| 2003/0093755 A1 | 5/2003 | O'Carroll |
| 2003/0105759 A1 | 6/2003 | Bess et al. |
| 2003/0115481 A1 | 6/2003 | Baird et al. |
| 2003/0126102 A1 | 7/2003 | Borthwick |
| 2003/0171942 A1 | 9/2003 | Gaito |
| 2003/0177112 A1 | 9/2003 | Gardner |
| 2003/0182313 A1 | 9/2003 | Federwisch et al. |
| 2003/0212718 A1 | 11/2003 | Tester |
| 2004/0003009 A1 | 1/2004 | Wilmot |
| 2004/0006523 A1 | 1/2004 | Coker |
| 2004/0034570 A1 | 2/2004 | Davis |
| 2004/0044648 A1 | 3/2004 | Anfindsen et al. |
| 2004/0078451 A1 | 4/2004 | Dietz et al. |
| 2004/0083466 A1 | 4/2004 | Dapp et al. |
| 2004/0117387 A1 | 6/2004 | Civetta et al. |
| 2004/0153451 A1 | 8/2004 | Phillips et al. |
| 2004/0205492 A1 | 10/2004 | Newsome |
| 2004/0210763 A1 | 10/2004 | Jonas |
| 2004/0236688 A1 | 11/2004 | Bozeman |
| 2004/0236711 A1 | 11/2004 | Nixon et al. |
| 2005/0010472 A1 | 1/2005 | Quatse et al. |
| 2005/0028094 A1 | 2/2005 | Allyn |
| 2005/0039116 A1 | 2/2005 | Slack-Smith |
| 2005/0091186 A1 | 4/2005 | Elish |
| 2005/0097441 A1 | 5/2005 | Herbach et al. |
| 2005/0102328 A1 | 5/2005 | Ring et al. |
| 2005/0125715 A1 | 6/2005 | Di Franco et al. |
| 2005/0131935 A1 | 6/2005 | O'Leary et al. |
| 2005/0262493 A1 | 11/2005 | Schmidt et al. |
| 2005/0262512 A1 | 11/2005 | Schmidt et al. |

(56) References Cited

U.S. PATENT DOCUMENTS

| | | |
|---|---|---|
| 2006/0010130 A1 | 1/2006 | Leff et al. |
| 2006/0026561 A1 | 2/2006 | Bauman et al. |
| 2006/0031779 A1 | 2/2006 | Theurer et al. |
| 2006/0045470 A1 | 3/2006 | Poslinski et al. |
| 2006/0053097 A1 | 3/2006 | King et al. |
| 2006/0053170 A1 | 3/2006 | Hill et al. |
| 2006/0059423 A1 | 3/2006 | Lehmann et al. |
| 2006/0074866 A1 | 4/2006 | Chamberlain et al. |
| 2006/0080139 A1 | 4/2006 | Mainzer |
| 2006/0080283 A1 | 4/2006 | Shipman |
| 2006/0080316 A1 | 4/2006 | Gilmore et al. |
| 2006/0129746 A1 | 6/2006 | Porter |
| 2006/0136513 A1 | 6/2006 | Ngo et al. |
| 2006/0143075 A1 | 6/2006 | Carr et al. |
| 2006/0155654 A1 | 7/2006 | Plessis et al. |
| 2006/0178915 A1 | 8/2006 | Chao |
| 2006/0178954 A1 | 8/2006 | Thukral et al. |
| 2006/0218206 A1 | 9/2006 | Bourbonnais et al. |
| 2006/0218491 A1 | 9/2006 | Grossman et al. |
| 2006/0253502 A1 | 11/2006 | Raman et al. |
| 2006/0265417 A1 | 11/2006 | Amato et al. |
| 2006/0277460 A1 | 12/2006 | Forstall et al. |
| 2007/0000999 A1 | 1/2007 | Kubo et al. |
| 2007/0018986 A1 | 1/2007 | Hauser |
| 2007/0043686 A1 | 2/2007 | Teng et al. |
| 2007/0061752 A1 | 3/2007 | Cory |
| 2007/0067285 A1 | 3/2007 | Blume |
| 2007/0113164 A1 | 5/2007 | Hansen et al. |
| 2007/0136095 A1 | 6/2007 | Weinstein |
| 2007/0162454 A1 | 7/2007 | D'Albora et al. |
| 2007/0168871 A1 | 7/2007 | Jenkins |
| 2007/0174760 A1 | 7/2007 | Chamberlain et al. |
| 2007/0178501 A1 | 8/2007 | Rabinowitz et al. |
| 2007/0185850 A1 | 8/2007 | Walters et al. |
| 2007/0192122 A1 | 8/2007 | Routson et al. |
| 2007/0233756 A1 | 10/2007 | D'Souza et al. |
| 2007/0245339 A1 | 10/2007 | Bauman et al. |
| 2007/0271317 A1 | 11/2007 | Carmel |
| 2007/0284433 A1 | 12/2007 | Domenica et al. |
| 2007/0295797 A1 | 12/2007 | Herman et al. |
| 2007/0299697 A1 | 12/2007 | Friedlander et al. |
| 2008/0005063 A1 | 1/2008 | Seeds |
| 2008/0016155 A1 | 1/2008 | Khalatian |
| 2008/0091693 A1 | 4/2008 | Murthy |
| 2008/0109714 A1 | 5/2008 | Kumar et al. |
| 2008/0126344 A1 | 5/2008 | Hoffman et al. |
| 2008/0126951 A1 | 5/2008 | Sood et al. |
| 2008/0140387 A1 | 6/2008 | Linker |
| 2008/0172607 A1 | 7/2008 | Baer |
| 2008/0177782 A1 | 7/2008 | Poston et al. |
| 2008/0186904 A1 | 8/2008 | Koyama et al. |
| 2008/0195672 A1 | 8/2008 | Hamel et al. |
| 2008/0208735 A1 | 8/2008 | Balet et al. |
| 2008/0228467 A1 | 9/2008 | Womack et al. |
| 2008/0249820 A1 | 10/2008 | Pathria |
| 2008/0267386 A1 | 10/2008 | Cooper |
| 2008/0270316 A1 | 10/2008 | Guidotti et al. |
| 2008/0276167 A1 | 11/2008 | Michael |
| 2008/0281580 A1 | 11/2008 | Zabokritski |
| 2008/0288475 A1 | 11/2008 | Kim et al. |
| 2008/0301042 A1 | 12/2008 | Patzer |
| 2008/0313132 A1 | 12/2008 | Hao et al. |
| 2008/0313243 A1 | 12/2008 | Poston et al. |
| 2009/0024962 A1 | 1/2009 | Gotz |
| 2009/0031401 A1 | 1/2009 | Cudich et al. |
| 2009/0043801 A1 | 2/2009 | LeClair |
| 2009/0055487 A1 | 2/2009 | Moraes et al. |
| 2009/0089651 A1 | 4/2009 | Herberger et al. |
| 2009/0094270 A1 | 4/2009 | Alirez et al. |
| 2009/0106178 A1 | 4/2009 | Chu |
| 2009/0106242 A1 * | 4/2009 | McGrew .......... G06F 16/2365 |
| 2009/0112678 A1 | 4/2009 | Luzardo |
| 2009/0112745 A1 | 4/2009 | Stefanescu |
| 2009/0150868 A1 | 6/2009 | Chakra et al. |
| 2009/0157732 A1 | 6/2009 | Hao et al. |
| 2009/0164387 A1 | 6/2009 | Armstrong et al. |
| 2009/0164934 A1 | 6/2009 | Bhattiprolu et al. |
| 2009/0177962 A1 | 7/2009 | Gusmorino et al. |
| 2009/0187546 A1 | 7/2009 | Whyte et al. |
| 2009/0199106 A1 | 8/2009 | Jonsson et al. |
| 2009/0216562 A1 | 8/2009 | Faulkner et al. |
| 2009/0228365 A1 | 9/2009 | Tomchek et al. |
| 2009/0228507 A1 | 9/2009 | Jain et al. |
| 2009/0248757 A1 | 10/2009 | Havewala et al. |
| 2009/0249178 A1 | 10/2009 | Ambrosino et al. |
| 2009/0249244 A1 | 10/2009 | Robinson et al. |
| 2009/0271343 A1 | 10/2009 | Vaiciulis et al. |
| 2009/0281839 A1 | 11/2009 | Lynn et al. |
| 2009/0282068 A1 | 11/2009 | Shockro et al. |
| 2009/0287470 A1 | 11/2009 | Farnsworth et al. |
| 2009/0299830 A1 | 12/2009 | West et al. |
| 2009/0307049 A1 | 12/2009 | Elliott et al. |
| 2009/0313311 A1 | 12/2009 | Hoffmann et al. |
| 2009/0313463 A1 | 12/2009 | Pang et al. |
| 2009/0319515 A1 | 12/2009 | Minton et al. |
| 2009/0319891 A1 | 12/2009 | MacKinlay |
| 2010/0004857 A1 | 1/2010 | Pereira et al. |
| 2010/0057622 A1 | 3/2010 | Faith et al. |
| 2010/0070531 A1 | 3/2010 | Aymeloglu et al. |
| 2010/0070842 A1 | 3/2010 | Aymeloglu et al. |
| 2010/0070844 A1 | 3/2010 | Aymeloglu et al. |
| 2010/0076813 A1 | 3/2010 | Ghosh et al. |
| 2010/0082541 A1 | 4/2010 | Kottomtharayil |
| 2010/0082671 A1 | 4/2010 | Li et al. |
| 2010/0098318 A1 | 4/2010 | Anderson |
| 2010/0114817 A1 | 5/2010 | Broeder et al. |
| 2010/0114831 A1 | 5/2010 | Gilbert et al. |
| 2010/0122152 A1 | 5/2010 | Chamberlain et al. |
| 2010/0145909 A1 | 6/2010 | Ngo |
| 2010/0204983 A1 | 8/2010 | Chung et al. |
| 2010/0223260 A1 | 9/2010 | Wu |
| 2010/0238174 A1 | 9/2010 | Haub et al. |
| 2010/0262901 A1 | 10/2010 | DiSalvo |
| 2010/0280851 A1 | 11/2010 | Merkin |
| 2010/0306285 A1 | 12/2010 | Shah et al. |
| 2010/0306722 A1 | 12/2010 | LeHoty et al. |
| 2010/0313239 A1 | 12/2010 | Chakra et al. |
| 2011/0004626 A1 | 1/2011 | Naeymi-Rad et al. |
| 2011/0047540 A1 | 2/2011 | Williams et al. |
| 2011/0066497 A1 | 3/2011 | Gopinath et al. |
| 2011/0074788 A1 | 3/2011 | Regan et al. |
| 2011/0093327 A1 | 4/2011 | Fordyce, III et al. |
| 2011/0099133 A1 | 4/2011 | Chang et al. |
| 2011/0107196 A1 | 5/2011 | Foster |
| 2011/0161409 A1 | 6/2011 | Nair |
| 2011/0173093 A1 | 7/2011 | Psota et al. |
| 2011/0179048 A1 | 7/2011 | Satlow |
| 2011/0208565 A1 | 8/2011 | Ross et al. |
| 2011/0208822 A1 | 8/2011 | Rathod |
| 2011/0225482 A1 | 9/2011 | Chan et al. |
| 2011/0225586 A1 | 9/2011 | Bentley et al. |
| 2011/0252282 A1 | 10/2011 | Meek et al. |
| 2011/0258216 A1 | 10/2011 | Supakkul et al. |
| 2012/0004894 A1 | 1/2012 | Butler |
| 2012/0022945 A1 | 1/2012 | Falkenborg et al. |
| 2012/0059853 A1 | 3/2012 | Jagota |
| 2012/0065987 A1 | 3/2012 | Farooq et al. |
| 2012/0078595 A1 | 3/2012 | Balandin et al. |
| 2012/0084117 A1 | 4/2012 | Tavares et al. |
| 2012/0084184 A1 | 4/2012 | Raleigh |
| 2012/0084287 A1 | 4/2012 | Lakshminarayan et al. |
| 2012/0089606 A1 | 4/2012 | Eshwar et al. |
| 2012/0123989 A1 | 5/2012 | Yu et al. |
| 2012/0136804 A1 | 5/2012 | Lucia |
| 2012/0188252 A1 | 7/2012 | Law |
| 2012/0191446 A1 | 7/2012 | Binsztok et al. |
| 2012/0197657 A1 | 8/2012 | Prodanovic |
| 2012/0197660 A1 | 8/2012 | Prodanovic |
| 2012/0215784 A1 | 8/2012 | King et al. |
| 2012/0226590 A1 | 9/2012 | Love et al. |
| 2012/0266245 A1 | 10/2012 | McDougal et al. |
| 2012/0284670 A1 | 11/2012 | Kashik et al. |
| 2012/0304244 A1 | 11/2012 | Xie et al. |
| 2012/0323829 A1 | 12/2012 | Stokes et al. |

(56) References Cited

U.S. PATENT DOCUMENTS

| | | | |
|---|---|---|---|
| 2013/0006947 A1 | 1/2013 | Akinyemi et al. |
| 2013/0016106 A1 | 1/2013 | Yip et al. |
| 2013/0055264 A1 | 2/2013 | Burr et al. |
| 2013/0096968 A1 | 4/2013 | Van Pelt et al. |
| 2013/0097130 A1 | 4/2013 | Bingol et al. |
| 2013/0097482 A1 | 4/2013 | Marantz et al. |
| 2013/0124193 A1 | 5/2013 | Holmberg |
| 2013/0124567 A1 | 5/2013 | Balinsky et al. |
| 2013/0132348 A1 | 5/2013 | Garrod |
| 2013/0151305 A1 | 6/2013 | Akinola et al. |
| 2013/0151453 A1 | 6/2013 | Bhanot et al. |
| 2013/0166480 A1 | 6/2013 | Popescu et al. |
| 2013/0226879 A1 | 8/2013 | Talukder et al. |
| 2013/0226944 A1 | 8/2013 | Baid et al. |
| 2013/0246316 A1 | 9/2013 | Zhao et al. |
| 2013/0262527 A1 | 10/2013 | Hunter et al. |
| 2013/0262528 A1 | 10/2013 | Foit |
| 2013/0263019 A1 | 10/2013 | Castellanos et al. |
| 2013/0288719 A1 | 10/2013 | Alonzo |
| 2013/0325826 A1 | 12/2013 | Agarwal et al. |
| 2014/0006404 A1 | 1/2014 | McGrew et al. |
| 2014/0089339 A1 | 3/2014 | Siddiqui et al. |
| 2014/0095363 A1 | 4/2014 | Caldwell |
| 2014/0108074 A1 | 4/2014 | Miller et al. |
| 2014/0129936 A1 | 5/2014 | Richards et al. |
| 2014/0208281 A1 | 7/2014 | Ming |
| 2014/0222793 A1 | 8/2014 | Sadkin et al. |
| 2014/0244284 A1 | 8/2014 | Smith |
| 2014/0358829 A1 | 12/2014 | Hurwitz |
| 2015/0012509 A1 | 1/2015 | Kirn |
| 2015/0026622 A1 | 1/2015 | Roaldson et al. |
| 2015/0046481 A1 | 2/2015 | Elliot |
| 2015/0073954 A1 | 3/2015 | Braff |
| 2015/0089353 A1 | 3/2015 | Folkening |
| 2015/0100907 A1 | 4/2015 | Erenrich et al. |
| 2015/0106379 A1 | 4/2015 | Elliot et al. |
| 2015/0186483 A1 | 7/2015 | Tappan et al. |
| 2015/0212663 A1 | 7/2015 | Papale et al. |
| 2015/0254220 A1 | 9/2015 | Burr et al. |
| 2016/0062555 A1 | 3/2016 | Ward et al. |
| 2016/0098176 A1 | 4/2016 | Cervelli et al. |
| 2016/0110369 A1 | 4/2016 | Cervelli et al. |
| 2016/0162519 A1 | 6/2016 | Stowe et al. |
| 2016/0180245 A1* | 6/2016 | Tereshkov | G06F 16/2237 706/12 |
| 2017/0091320 A1* | 3/2017 | Psota | G06F 16/334 |
| 2018/0144095 A1* | 5/2018 | Fellowes | G16H 40/67 |

FOREIGN PATENT DOCUMENTS

| | | |
|---|---|---|
| CN | 102054015 | 5/2014 |
| DE | 102014204827 | 9/2014 |
| DE | 102014204830 | 9/2014 |
| DE | 102014204834 | 9/2014 |
| DE | 102014213036 | 1/2015 |
| EP | 1672527 | 6/2006 |
| EP | 2487610 | 8/2012 |
| EP | 2778913 | 9/2014 |
| EP | 2778914 | 9/2014 |
| EP | 2993595 | 3/2016 |
| EP | 3002691 | 4/2016 |
| EP | 3009943 | 4/2016 |
| EP | 3032441 | 6/2016 |
| EP | 3035214 | 6/2016 |
| GB | 2366498 | 3/2002 |
| GB | 2513472 | 10/2014 |
| GB | 2513721 | 11/2014 |
| GB | 2517582 | 2/2015 |
| NL | 2013134 | 1/2015 |
| WO | WO 01/025906 | 4/2001 |
| WO | WO 2001/088750 | 11/2001 |
| WO | WO 2007/133206 | 11/2007 |
| WO | WO 2009/051987 | 4/2009 |
| WO | WO 2010/030913 | 3/2010 |
| WO | WO 2010/030914 | 3/2010 |
| WO | WO 2010/030919 | 3/2010 |
| WO | WO 2012/061162 | 5/2012 |
| WO | WO 2012/119008 | 9/2012 |

OTHER PUBLICATIONS

Abbey, Kristen, "Review of Google Docs," May 1, 2007, pp. 2.
Adams et al., "Worklets: A Service-Oriented Implementation of Dynamic Flexibility in Workflows," R. Meersman, Z. Tari et al. (Eds.): OTM 2006, LNCS, 4275, pp. 291-308, 2006.
Anonymous, "A Real-World Problem of Matching Records," Nov. 2006, <http://grupoweb.upf.es/bd-web/slides/ullman.pdf> pp. 1-16.
Bluttman et al., "Excel Formulas and Functions for Dummies," 2005, Wiley Publishing, Inc., pp. 280, 284-286.
Brandel, Mary, "Data Loss Prevention Dos and Don'ts," <http://web.archive.org/web/20080724024847/http://www.csoonline.com/article/221272/Dos_and_Don_ts_for_Data_Loss_Prevention>, Oct. 10, 2007, pp. 5.
Chaudhuri et al., "An Overview of Business Intelligence Technology," Communications of the ACM, Aug. 2011, vol. 54, No. 8.
Conner, Nancy, "Google Apps: The Missing Manual," May 1, 2008, pp. 15.
Delicious, <http://delicious.com/> as printed May 15, 2014 in 1 page.
"E-MailRelay," <http://web.archive.org/web/20080821175021/http://emailrelay.sourceforge.net/> Aug. 21, 2008, pp. 2.
Ferreira et al., "A Scheme for Analyzing Electronic Payment Systems," Brazil 1997.
Galliford, Miles, "SnagIt Versus Free Screen Capture Software: Critical Tools for Website Owners," <http://www.subhub.com/articles/free-screen-capture-software>, Mar. 27, 2008, pp. 11.
Gill et al., "Computerised Linking of Medical Records: Methodological Guidelines," Journal of Epidemiology and Community Health, 1993, vol. 47, pp. 316-319.
"GrabUp—What a Timesaver!" <http://atlchris.com/191/grabup/>, Aug. 11, 2008, pp. 3.
Gu et al., "Record Linkage: Current Practice and Future Directions," Jan. 15, 2004, pp. 32.
Hua et al., "A Multi-attribute Data Structure with Parallel Bloom Filters for Network Services", HiPC 2006, LNCS 4297, pp. 277-288, 2006.
JetScreenshot.com, "Share Screenshots via Internet in Seconds," <http://web.archive.org/web/20130807164204/http://www.jetscreenshot.com/>, Aug. 7, 2013, pp. 1.
Johnson, Maggie "Introduction to YACC and Bison", Handout 13, Jul. 8, 2005, in 11 pages.
Johnson, Steve, "Access 2013 on demand," Access 2013 on Demand, May 9, 2013, Que Publishing, 22 pages.
Kwout, <http://web.archive.org/web/20080905132448/http://www.kwout.com/> Sep. 5, 2008, pp. 2.
Lim et al., "Resolving Attribute Incompatibility in Database Integration: An Evidential Reasoning Approach," Department of Computer Science, University of Minnesota, 1994, <http://reference.kfupm.edu.sa/content/r/e/resolving_attribute_incompatibility_in_d_531691.pdf> pp. 1-10.
Litwin et al., "Multidatabase Interoperability," IEEE Computer, Dec. 1986, vol. 19, No. 12, http://www.lamsade.dauphine.fr/~litwin/mdb-interoperability.pdf, pp. 10-18.
Microsoft Windows, "Microsoft Windows Version 2002 Print Out 2," 2002, pp. 1-6.
Microsoft, "Registering an Application to a URI Scheme," <http://msdn.microsoft.com/en-us/library/aa767914.aspx>, printed Apr. 4, 2009 in 4 pages.
Microsoft, "Using the Clipboard," <http://msdn.microsoft.com/en-us/library/ms649016.aspx>, printed Jun. 8, 2009 in 20 pages.
Nadeau et al., "A Survey of Named Entity Recognition and Classification," Jan. 15, 2004, pp. 20.
Nin et al., "On the Use of Semantic Blocking Techniques for Data Cleansing and Integration," 11th International Database Engineering and Applications Symposium, 2007, pp. 9.

(56) References Cited

OTHER PUBLICATIONS

Nitro, "Trick: How to Capture a Screenshot as PDF, Annotate, Then Share It," <http://blog.nitropdf.com/2008/03/04/trick-how-to-capture-a-screenshot-as-pdf-annotate-it-then-share/>, Mar. 4, 2008, pp. 2.

Online Tech Tips, "Clip2Net—Share files, folders and screenshots easily," <http://www.online-tech-tips.com/free-software-downloads/share-files-folders-screenshots/>, Apr. 2, 2008, pp. 5.

O'Reilly.com, http://oreilly.com/digitalmedia/2006/01/01/mac-os-x-screenshot-secrets.html published Jan. 1, 2006 in 10 pages.

Pythagoras Communications Ltd., "Microsoft CRM Duplicate Detection," Sep. 13, 2011, https://www.youtube.com/watch?v=j-7Qis0D0Kc.

Qiang et al., "A Mutual-Information-Based Approach to Entity Reconciliation in Heterogeneous Databases," Proceedings of 2008 International Conference on Computer Science & Software Engineering, IEEE Computer Society, New York, NY, Dec. 12-14, 2008, pp. 666-669.

Schroder, Stan, "15 Ways to Create Website Screenshots," <http://mashable.com/2007/08/24/web-screenshots/>, Aug. 24, 2007, pp. 2.

Sekine et al., "Definition, Dictionaries and Tagger for Extended Named Entity Hierarchy," May 2004, pp. 1977-1980.

SnagIt, "SnagIt 8.1.0 Print Out 2," Software release date Jun. 15, 2006, pp. 1-3.

SnagIt, "SnagIt 8.1.0 Print Out," Software release date Jun. 15, 2006, pp. 6.

SnagIt, "SnagIt Online Help Guide," <http://download.techsmith.com/snagit/docs/onlinehelp/enu/snagit_help.pdf>, TechSmith Corp., Version 8.1, printed Feb. 7, 2007, pp. 284.

Wang et al., "Research on a Clustering Data De-Duplication Mechanism Based on Bloom Filter," IEEE 2010, 5 pages.

Warren, Christina, "TUAW Faceoff: Screenshot apps on the firing line," <http://www.tuaw.com/2008/05/05/tuaw-faceoff-screenshot-apps-on-the-firing-line/>, May 5, 2008, pp. 11.

Wikipedia, "Multimap," Jan. 1, 2013, https://en.wikipedia.org/w/index.php?title=Multimap&oldid=530800748.

Winkler, William E., "Bureau of the Census Statistical Research Division Record Linkage Software and Methods for Merging Administrative Lists," Statistical Research Report Series No. RR2001/03, Jul. 23, 2001, https://www.census.gov/srd/papers/pdf/rr2001-03.pdf, retrieved on Mar. 9, 2016.

Zhao et al., "Entity Matching Across Heterogeneous Data Sources: An Approach Based on Constrained Cascade Generalization," Data & Knowledge Engineering, vol. 66, No. 3, Sep. 2008, pp. 368-381.

\* cited by examiner

| | Entity Info | | | Headquarter Location | | | | | | Phone Number | Email |
|---|---|---|---|---|---|---|---|---|---|---|---|
| Number | Company Name | Company Type | Stock Ticker | Country | State | City | Zip Code | Street Address | | | |
| 1 | Firestone Tire and Rubber Company | Subsidiary | None | United States | Tennessee | Nashville | 12345 | 123 Mail St. | 1234567899 | Firestone@email.com |
| 2 | BridgeStone | Corporation | TYO | Japan | Unknown | Unknown | 22222 | 987 Hill Drive | (987) 654-3210 | Bridgestone@email.com |
| 3 | Michelin | Corporation | ML | France | Unknown | Unknown | 12345 | 777 Tech Street | (123) 456-7899 | Michelin@email.com |
| 4 | Company 4 | LLC | ABC | United States | California | San Diego | 33333 | 111 Bio Circle | 7134432109 | Co4@email.com |
| 5 | Company 5 | LLP | XYZ | United States | CA | Unknown | Unknown | Unknown | 9876543210 | Co5@email.com |
| . | . | . | . | . | . | . | . | . | . | . |
| . | . | . | . | . | . | . | . | . | . | . |
| . | . | . | . | . | . | . | . | . | . | . |
| . | . | . | . | . | . | . | . | . | . | . |
| . | . | . | . | . | . | . | . | . | . | . |
| 100,000,000,000 | Company N | Unknown | Unknown | United States | TX | Dallas | 76262 | 613 Lovers Lane | (444) 111-3301 | CoN@email.com |

FIG. 2

| Number | Entity Name | Entity Location ||||| Phone Number | Email |
| --- | --- | --- | --- | --- | --- | --- | --- |
| | | State | City | Zip Code | Street Address | | |
| 1 | Fire Stone | Tennessee | Nashville | 12345 | 123 Mail St. | 1234567899 | Firestone@email.com |
| 2 | Fstone | Unknown | Unknown | 22222 | 987 Hill Drive | (987) 654-3210 | FStone@email.com |
| 3 | FS | Unknown | Unknown | 12345 | 777 Tech Street | (123) 456-7899 | FS@email.com |
| 4 | FSTire | California | San Diego | 33333 | 111 Bio Circle | 7134432109 | FSTire@email.com |
| 5 | StoneTire | CA | Unknown | Unknown | Unknown | 9876543210 | StoneTire@email.com |
| . | . | . | . | . | . | . | . |
| . | . | . | . | . | . | . | . |
| . | . | . | . | . | . | . | . |
| . | . | . | . | . | . | . | . |
| . | . | . | . | . | . | . | . |
| 50,000,000,000 | User N | TX | Dallas | 76262 | 613 Lovers Lane | (444) 111-3301 | Dallas@TX.com |

FIG. 3

SYSTEMS AND METHODS FOR RESOLVING ENTITY DATA ACROSS VARIOUS DATA STRUCTURES

BACKGROUND

In some situations, resolving data entries from multiple large lists of records can be relatively straightforward. One particular situation is when records in separate lists are very similar and it is desired to obtain information from both records that share a particular value or character string in a particular field. The fields at issue can be isolated using filtering functions of data interfacing software and the desired information retrieved. By using combinations of filtering functions, more sophistication can be provided to the way in which fields are identified for comparison. Once compared, some records can be isolated based on the comparisons on the particular fields. The isolated records can then be aggregated so as to provide a report including all the records that together constitute the desired shared information.

But in order to recognize common records, such filtering functions rely on identical fields across the records. In the real world, lists may have no identical fields across the records, despite those records being related, or may have identical fields in a relatively small number of fields (or parts of fields) such that existing filtering functions are unable to provide isolation of the desired records from other records. For example, such problems can occur when a list has records originating from a number of different sources. This problem only worsens as the size of lists becomes larger (e.g., a list having billions of records), in terms of the number of records present. With the sizes of lists in the real world increasing as time progresses, this problem is expected to worsen over time.

SUMMARY

The systems, methods, and devices described herein each have several aspects, no single one of which is solely responsible for its desirable attributes. Without limiting the scope of this disclosure, several non-limiting features will now be discussed briefly.

Embodiments of the present disclosure relate to an entity resolution system that may automatically analyze a data structure or structures containing large numbers of records, identify records that relate to a common entity, resolve these records against a canonical data set using direct matching and advanced matching algorithms. The advanced matching algorithms may include utilizing fuzzy keyword searching, fuzzy name searching, string comparators, map comparators and cascading thresholds. Embodiments of the present disclosure also relate to the automated scoring of record pairs to assess the likelihood of relating to a common entity which inform the threshold values used.

As described below, records in a data structure (e.g., a list) may include one or more fields. A field may include any data, information, or things, such as a person, a place, a company, a facility, demographic information, revenue streams, tax withholdings, and/or the like. In an example application, a human analyst may be tasked with resolving company names across multiple lists based on a company name and location. However, the human analyst may be unable to timely parse through thousands or millions of records to resolve company names that are common between two or more lists containing company information, such that multiple names for the same entity across multiple lists may be resolved to a single name for each entity without the computing technology and the embodiments of the present disclosure. Further, the implementation of the various embodiments of the present disclosure via computer technology enables many of the advantages described herein, including more efficient interaction with, and presentation of, various types of electronic data.

According to an embodiment, a system is disclosed comprising a plurality of processors, at least one storage device configured to store data; and a network communication interface configured to receive a request from a remote device to perform a processing operation on a first portion of the data, wherein the system is configured to access first data of a first data store of the storage device, wherein the first data comprises a first plurality of entity entries, access second data from a second data store, wherein the second data comprises a second plurality of entity entries, wherein each entry of the first plurality of entity entries and the second plurality of entity entries comprises a plurality of fields, identify, from the first plurality of entity entries and the second plurality of entity entries, a first set of resolved entities based on a direct field, determine, from the first set of resolved entities, updated first data and updated second data, identify a second set of resolved entities based on the updated first data and the updated second data, and transmit the first set of resolved entities and the second set of resolved entities to a computing device.

According to an aspect, cleansing the first data and/or the second data is cleansed prior to identifying the direct field. According to another aspect, cleansing the data comprises formatting at least one field of the plurality of entity entries.

According to yet another aspect, wherein determining the updated first data comprises removing, from the first data, entries corresponding to the first set of resolved entities.

According to another aspect, wherein determining the updated second data comprises removing, from the second data, entries corresponding to the first set of resolved entities.

According to yet another aspect, wherein the identifying the second set of resolved entities comprises executing a comparison using a plurality of string comparators on a first field from the updated first data and a second field from the updated second data, determining a metric based on the comparison, and determining the metric exceeds a threshold. According to another aspect, threshold is based at least in part on a data distribution curve. According to yet another aspect, the string comparators include map comparators and/or string comparators. According to another aspect, determining the metric is based at least in part on calculating a product of a levenshtein distance calculation, a least common substring calculation, a jaccard similarity calculation, and a cosine similarity ngram calculation.

According to yet another aspect, the remote device comprises the computing device.

According to another embodiment, a method is disclosed comprising accessing first data of a first data store of the storage device, wherein the first data comprises a first plurality of entity entries, accessing second data from a second data store, wherein the second data comprises a second plurality of entity entries, wherein each entry of the first plurality of entity entries and the second plurality of entity entries comprises a plurality of fields, identifying, from the first plurality of entity entries and the second plurality of entity entries, a first set of resolved entities based on a direct field, determining, from the first set of resolved entities, updated first data and updated second data, identifying a second set of resolved entities based on the updated first data, the updated second data, and an arbitrary threshold, and transmitting the first set of resolved entities and the second set of resolved entities to a computing device.

According to another aspect, cleansing the first data and/or the second data prior to identifying the direct field.

According to yet another aspect, wherein cleansing of the data comprises formatting at least one field of the plurality of entity entries.

According to another aspect, wherein identifying the second set of resolved entities comprises executing a first comparison using a plurality of string comparators on a first field from the updated first data and a second field from the updated second data, determining a metric based on the comparison, and determining the metric exceeds the arbitrary threshold.

According to yet another aspect, determining that one or more metrics did not exceed the arbitrary threshold, generating a data distribution curve comprising distribution data based on the metrics, and adjusting the threshold based on the data distribution curve.

According to another aspect, executing a second comparison on the entities with metrics that did not exceed the initial arbitrary threshold, determining a new metric based on the second comparison, and determining the metric exceeds the adjusted threshold.

According to yet another embodiment, a non-transitory computer-readable storage medium is disclosed including computer-executable instructions that, when executed by a processor, cause the processor to access first data of a first data store of the storage device, wherein the first data comprises a first plurality of entity entries, access second data from a second data store, wherein the second data comprises a second plurality of entity entries, wherein each entry of the first plurality of entity entries and the second plurality of entity entries comprises a plurality of fields, identify, from the first plurality of entity entries and the second plurality of entity entries, a first set of resolved entities based on a direct field, determine, from the first set of resolved entities, updated first data and updated second data, identify a second set of resolved entities based on the updated first data and the updated second data, and transmit the first set of resolved entities and the second set of resolved entities to a computing device.

According to yet another aspect, the computer-executable instructions further cause the processor to execute a comparison using a plurality of string comparators on a first field from the updated first data and a second field from the updated second data, determine a metric based on the comparison, and determine the metric exceeds a threshold.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

Reference will now be made to the accompanying drawings, which illustrate example embodiments of the present disclosure and in which:

FIG. 2 is a block diagram of an example first list, consistent with embodiments of the present disclosure;

FIG. 3 is a block diagram of an example second list, consistent with embodiments of the present disclosure;

DETAILED DESCRIPTION

Figure 1:
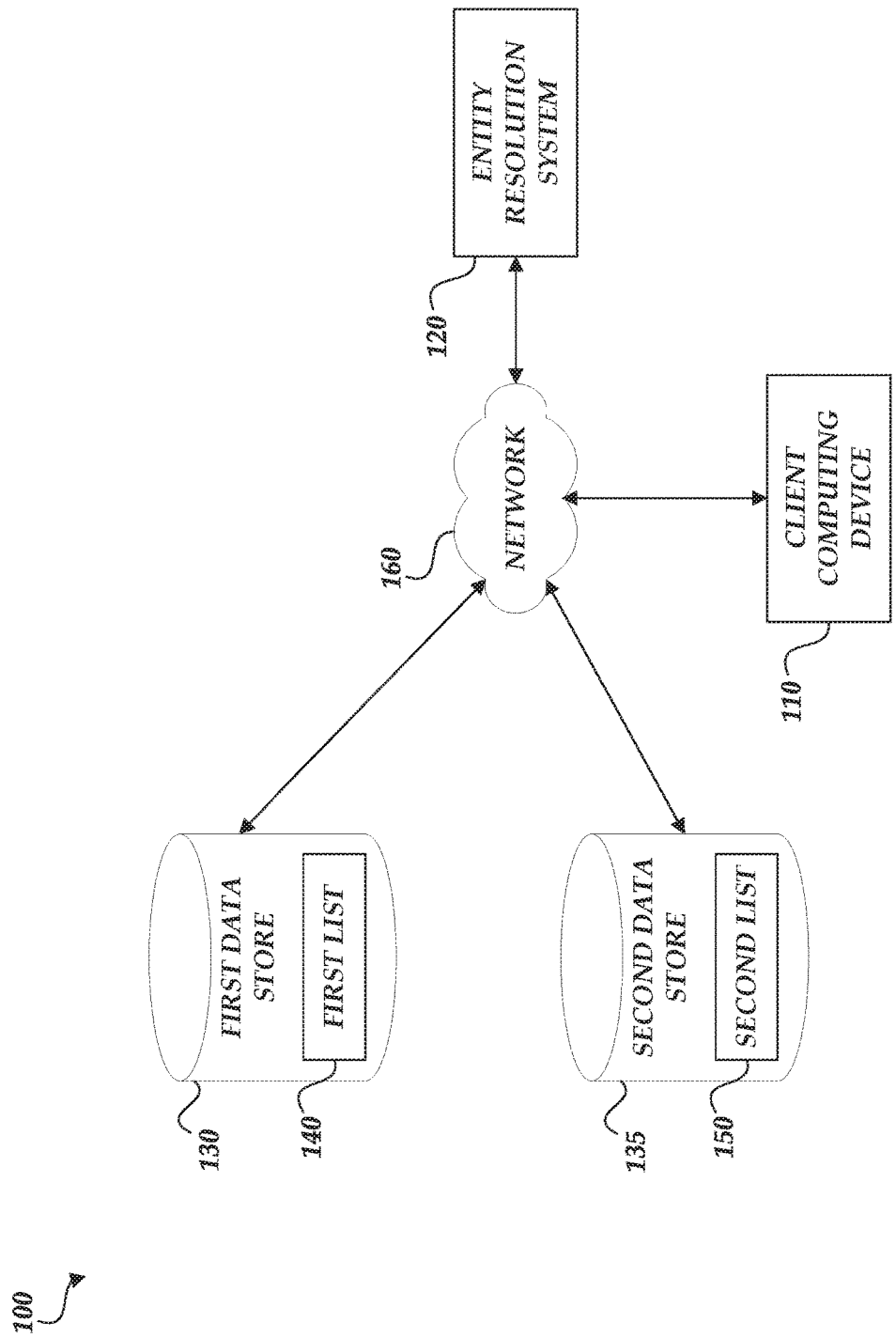
FIG. 1 is a block diagram of an example system for resolving entity names across multiple data stores, consistent with embodiments of the present disclosure.

Reference will now be made in detail to example embodiments, the examples of which are illustrated in the accompanying drawings. Whenever possible, the same reference numbers will be used throughout the drawings to refer to the same or like parts.

Overview

Embodiments describe methods, systems, and non-transitory computer-readable mediums for associating related records to common entities across multiple lists. As stated previously, the one or more lists of data may be large, for example having billions of records. Some embodiments of the application can associate records that may not have useful identical fields while still excluding unrelated records, resulting in the association of records that relate to a common entity. Moreover, some embodiments of this application allow multiple lists of records that have no identical fields, but belong to the same common entity, to be associated to the common entity.

Further, some embodiments reduce the number of comparisons between multiple lists. With prior techniques, when a user desired to compare fields in multiple lists, every record in each list needed to be compared to every record in the every other list for a direct match. With some embodiments of this application, the number of entries in a list may be reduced systematically overtime such that only a subset of remaining entities need to be conditioned and subsequently analyzed for sufficient matches in the end. As such, the subset of entity names remaining may be conditioned and further manipulated, in accordance with embodiments described herein.

For example, assuming a first list comprises records that identify a plurality of entities by a distinct ID field and a second list identifies records from a plurality of entities, each with a distinct ID, in some embodiments, a system can cleanse and resolve all of the entities of the second list with the entities of the first list to determine whether one or more entries from the second list match one or more entries from the first list.

As will be appreciated by one of skill in the art in light of the description above, the embodiments disclosed herein substantially increase the ability of computing systems, such as content management systems, to identify and resolve discrepancies that would otherwise impair the function of a communication network and the computing systems themselves. Thus, the presently disclosed embodiments represent an improvement in the functioning of such computing systems, by enabling content management systems or other networked devices to continue to resolve entities across multiple lists even while identifying large numbers of unmatched entities. Moreover, the presently disclosed embodiments address technical problems inherent within computing systems; specifically, the limited ability of computing systems to efficiently resolve unmatched entities across multiple lists. These technical problems are addressed by various technical solutions described herein, including the utilization of match evaluators, blockers, cleaners, threshold assessors and adjusters to dynamically adjust threshold values based on match scores calculated, for example, by using fuzzy keyword searching or fuzzy name searching. Thus, the present application represents a substantial improvement on existing network systems and computing systems in general.

FIG. 1 is a block diagram of an example system 100 for resolving entity names across multiple data stores, consistent with embodiments of the present disclosure. As shown, example system 100 includes a client computing device 110, an entity resolution system 120, a first data store 130 which may include a first list 140, and a second data store 135 which may include in some embodiments a second list 150. Further, client computing device 110, entity resolution system 120, the first data store 130, and the second data store 135 can communicate over a network 160.

First list 140 and second list 150 can include data records, each having a number of fields. Examples of first list 140 and second list 150 are shown in FIGS. 2 and 3, respectively. However, first data store 130 does not need to include only first list 140. First data store 130 can include any numbers of lists. Also, example system 100 can include any number of data stores. In the case of more than two data stores, first list 140 and second list 150 can be in different data storage devices or can be in the same data storage device.

First list 140 and second list 150 can be any type of list, including a data structure, or part of a data structure, a database, or part of a database. Some examples of data structures are arrays, tuples, hash tables, sets, graphs, queues, stacks, etc. An example of a database is a Relational Database Management System (RDBMS) that stores the transaction data as rows in relational tables. Alternatively, first list 140 and second list 150 can be a column-oriented database management system that stores data as sections of columns of data rather than rows of data. This column-oriented DBMS can have advantages, for example, for data warehouses, customer relationship management systems, and library card catalogues, and other ad hoc inquiry systems where aggregates are computed over large numbers of similar data items. A column-oriented DBMS can be more efficient than an RDBMS when an aggregate needs to be computed over many rows but only for a notably smaller subset of all columns of data, because reading that smaller subset of data can be faster than reading all data. A column-oriented DBMS can be designed to efficiently return data for an entire column, in as few operations as possible. A column-oriented DBMS can store data by serializing each column of data of first list 140 and second list 150. First list 140 and second list 150 do not need to be the same type of list. In a preferred embodiment, either first list 140 or second list 150 may be a canonical data set against which other lists may be compared and resolved in view of the canonical data set.

Client computing device 110 can include one or more software applications configured to present data and translate user inputs into requests for record association by entity resolution system 120. Client computing device 110 can also run on entity resolution system 120. In any event, a user would interact with example system 100 through client computing device 110. And while client computing device 110 is shown in FIG. 1, it is appreciated that multiple client computing devices can interact with first data store 130, second data store 135, and entity resolution system 120.

Figure 4:
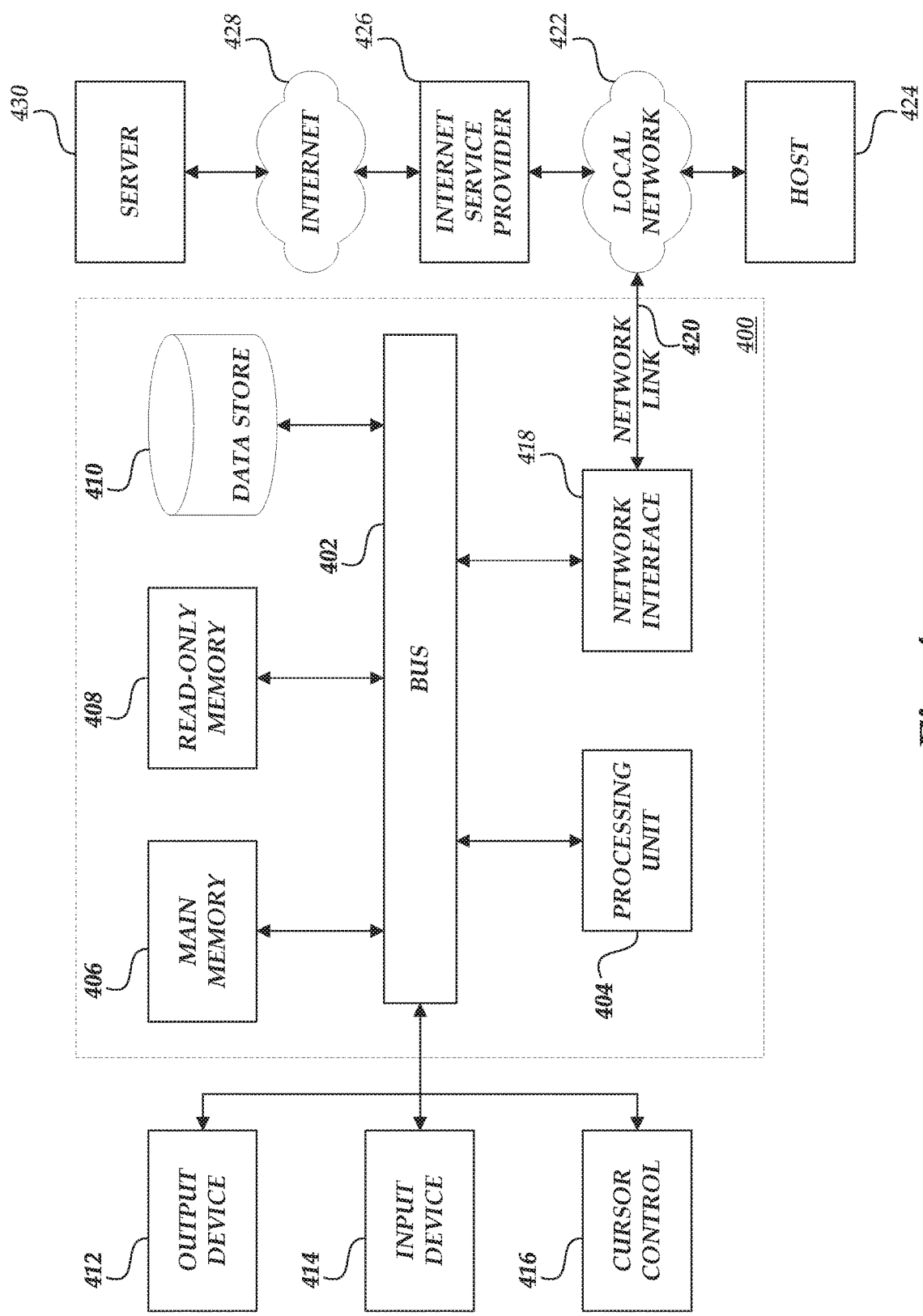
FIG. 4 is a block diagram of an example computer system, consistent with embodiments of the present disclosure.

Entity resolution system 120 can be a computing system configured to resolve data entries for various entities within the data lists. For example, entity resolution system 120 can be a computer system configured to execute software or a set of programmable instructions that collect or receive records from different lists and process those records across various lists located across various data stores, resulting in the identification of entity records that relate to a common entity. In some embodiments, entity resolution system 120 can be implemented using a computer system 400, as shown in FIG. 4 and described below.

Entity resolution system 120 can include one or more computing devices (e.g., server(s)), memory storing data and/or software instructions (e.g., database(s), memory device(s), etc.), and other known computing components. According to some embodiments, entity resolution system 120 can include one or more networked computers that execute processing in parallel or use a distributed computing architecture. Entity resolution system 120 can be configured to communicate with one or more components of system 100, and it can be configured to provide entity resolution information via an interface(s) accessible by users over a network (e.g., the Internet). For example, entity resolution system 120 can include a web server that hosts a web page accessible through network 160. In some embodiments, entity resolution system 120 can include an application server configured to provide data to one or more client applications executing on computing systems connected to entity resolution system 120 via network 160.

Entity resolution system 120 can read data from multiple lists (e.g., first list 140 and second list 150) from one or more data storage devices (e.g., first data store 130, second data store 135). Entity resolution system 120 can resolve data (e.g., company name entries) located in the various lists by applying a series of string comparators and map comparators while dynamically adjusting threshold values and defining specific scoring metrics, all in accordance with embodiments described herein.

Entity resolution system 120 can then store the resolution data on at least one of client computing device 110, entity resolution system 120, first data store 130, second data store 135, first list 140, and second list 150. Entity resolution system 120 can use the resolution data to associate records retrieved from first list 140 and second list 150. Entity resolution system 120 can also pair the records from first list 140 and second list 150. Entity resolution system 120 can use the pairs to provide insights about a particular company. Entity resolution system 120 can, in some embodiments, use the pairs to identify clusters of records that reference a common particular company. In other embodiments, entity resolution system 120 can use the pairs to identify a canonical entity for records that refer to the same company in different ways. For example, records may refer to a particular company name as "Firestone Tires," "Firestone," "Firestone Tire Shop," and "FT Shop." By identifying pairs of records that reference the entity, entity resolution system 120 can determine a canonical name for the entity name and associate all of the records in the cluster with the canonical name.

FIG. 2 is a block diagram of an example first list 140, consistent with embodiments of the present disclosure. First list 140 can store records associated with entities. As shown in FIG. 2, first list 140 can include a very large number of records.

For example, first list 140 includes 100 billion records. While each record of first list 140 is depicted as a separate row in FIG. 2, it will be understood that each such record can be represented in other ways, for example, by a column or any other technique in the art. Each record can include several categories of information. For example, first list 140 includes: number category 210; entity information category 220; headquarter location category 228; phone number category 240; and email category 250. It will be understood that FIG. 2 is merely example and that first list 140 can include more or less categories of information associated with a record.

Number category 210 can uniquely identify each record of first list 140. For example, first list 140 depicts 100 billion records as illustrated by number category 210 of the last row of first list 140 as 100,000,000,000. It will be understood that this disclosure is not limited to any number of records and further that this disclosure can extend to a list with more or less than 100 billion records. It is also appreciated that number category 210 need not exist in first list 140.

Entity information category 220 can identify information about an entity. In some embodiments, entity information category 220 can represent the entity information by providing at least one of: a name of the entity (e.g., company name sub-category 222; Firestone Tire and Rubber Company for record 201; Bridgestone for record 203); an entity type (e.g., company type sub-category 224; Subsidiary for record 201; LLP for record 205). For example, the information under entity information category 220 can be an entity filing number that can uniquely identify the company, a social security number that can identify a person, a phone number or a MAC address associated with a business phone number of the company, or any other identifier.

Entity location category 228 can represent location information of the entity. In some embodiments, entity location category 228 can represent the location information by providing at least one of: a country of residence (e.g., country sub-category 230; United States for record 201, Japan for record 202); a state of residence of the entity (e.g., state sub-category 232; Tennessee for record 201; CA for record 205); a city of residence of the entity (e.g., city sub-category 234; Nashville for record 201; unknown for record 205); a zip code of residence of the entity (e.g., zip code sub-category 236; 12345 for record 201; unknown for record 205); and a street address of residence of the entity (e.g., street address sub-category 238; 123 Mail Street for record 201; unknown for record 205).

Phone number category 240 can identify an entity's phone number. The phone number can be a character sequence. The character sequence can comprise of numbers, letters, spaces, or symbols, which can include "(," "),", ".," and "-." For example, phone number category 240 of record 201 is 1234567899, while phone number category 240 of record 302 is (987) 654-3210. Also, the phone number can be unknown. The phone number provides a way for the entity to be contacted over a phone. It would be recognized by a person of ordinary skill in the art that a phone number is not only for connecting over a phone.

Email category 250 can identify an entity's email address. The email address should include a sequence of numbers and letters followed by an "@" symbol. After the "@" symbol will be another sequence of numbers and letters followed by a period and another sequence of numbers and letters. For example, email category 250 of record 201 is Firestone@email.com. The email address can be unknown. The email address provides a way for the entity to be contacted over the internet. It would be recognized by a person of ordinary skill in the art that an email address is not only for connecting over the internet.

FIG. 3 is a block diagram of an example second list 150, consistent with embodiments of the present disclosure. Second list 150 can store data records associated with records involving multiple entities. As shown in FIG. 3, second list 150 can include data associated with a very large number of records associated with multiple entities. For example, second list 150 can include 50 billion records. While each record of second list 150 is depicted as a separate row in FIG. 3, it will be understood that each such record can be represented in other ways, for example, by a column or any other technique in the art. Each record can include several categories of information. In some instances, second list 150 may be similar in structure and/or content to first list 140. However, second list 150 may be substantially different in structure and/or content to first list 140. For example, second list 150 may include the same categories including the number category 310. However, second list 150 may include additional categories not shown in FIG. 3 (e.g., principal place of business, officer name, company annual revenue, number of years in operation, subsidiary names, number of office buildings, product information, and service information. It will be understood that FIG. 3 is merely example and that second list 150 can include more or less categories of information associated with a record.

Number category 310 can uniquely identify each record of second list 150. For example, second list 150 depicts 50 billion record as illustrated by number category 310 of the last row of second list 150 as 50,000,000,000. In FIG. 3, each row depicting a record can be identified by an element number. For example, record number 1 can be identified by element 301; record number 2 can be identified by element 302; and so on such that record 50,000,000,000 can be identified by 399B. It will be understood that this disclosure is not limited to any number of records and further that this disclosure can extend to lists with more or less than 50 billion records. It is also appreciated that number category 310 need not exist in second list 150.

Entity name category 320 and entity location category 330 may contain substantially the same type of information as in first list 200 (e.g., entity name or location information). In one example, first list 200 may contain a canonical data set. For example, a canonical data set is one in which the data entries (i.e., records) have been verified such that the content therein may be accepted as accurately depicting a label against which unverified labels may be compared against for accuracy (e.g., a gold standard). On the other hand, second list 300 may include a plurality of entries that are unverified or accepted as genuine. These entries may include misspellings or alternate spellings which may not directly match a verified entry located within the canonical data set (e.g., first list 200). It should be understood that "canonical" is a broad term and is to be given its ordinary and customary meaning to one of ordinary skill in the art.

In embodiments not inconsistent with disclosure herein, second list 300 may be compared against the canonical data set (e.g., first list 200) in order to resolve certain entities that are common across both lists despite the alternate spellings. For example, firestone and fstone may both refer to the same entity (Fire Stone Tire Company) and through a process of resolving data entries across multiple lists as described herein, those entity names may be selected as both referring to the same entity. Once that determination has been made, the canonical (i.e., gold standard) name may replace those data entries associated with the selected entity names such that a verified name would be left in its place (i.e., an entity resolution process). It should be understood that the terms entity "resolution" or "resolving" are broad terms and should be given their ordinary and customary meaning to one of ordinary skill in the art without being limited to a specific embodiment.

Principal place of business category (not shown) can represent which state or states a company is incorporated, organized, or headquartered. For example, principal place of business category can represent that the company is incorporated in State X and headquartered in State Y. Officer name category can represent the names of the chief executive officer (CEO), chief technology officer (CTO), chief financial officer (CFO), etc.

In some embodiments, information relating to individual facilities owned by a common entity can be stored in each record. For example, information for an individual facility (not shown) can include at least one of: total number of employees category, hours of operation category, individual product revenue category, and product information for individual facility category. In some embodiments, the total number of employees category can represent the number of employees associated with the company and, for example, their respective job title; the hours of operation category can represent holiday hours associated with the company; the individual product revenue category can represent revenue information (e.g., in relation to total revenue across all facilities) associated with the company; and the product information for each individual facility category can represent, for example, whether specific products are manufacture or designed at a specific facility. For example, if the user is looking for a specific Firestone tire model and the company has five facilities in Arizona that carry that model, a positive indication can be stored for those five facilities and if there are other facilities that do not carry that model, a negative indication can be stored. In some embodiments, the product information for each individual facility category can store information representing the model of tire carried by the individual facility.

Product information category (not shown) can represent information associated with a product that is involved in a record. For example, product information category can represent that the product involved in the record is a particular type of product based on a stock keeping unit ("SKU") of the product. In some embodiments, the product's SKU can be unique to a particular subsidiary involved in that particular record. Alternatively, product information category can represent the product involved in the record with at least one of a Universal Product Code, International Article Number, Global Trade Item Number, and Australian Product Number. Service information category can represent information associated with a service that is involved in a record. For example, service information category can represent that the service involved in the record is a particular type of service based on an SKU of the service. It will be appreciated that an SKU can uniquely represent either a product or a service. Some examples of services can be warranties, delivery fees, installation fees, and licenses.

In some embodiments, first list 140 may be a canonical list of entities, such as a list of company names and related information (e.g., board member information, postal codes, type of entity (e.g., LLC, C-Corp., S-Corp, etc.), etc.), and entity resolution service 120 may cleanse and resolve each record of the second list 150 with a canonical company name from the first list 140, as described in more detail below. In other embodiments, entity resolution service 120 may be utilized to resolve data entries for a single list. For example, the entity resolution service 120 may analyze a first list 140 to identify clusters of companies operating in a specific state that were associated with a common company. One skilled in the art will appreciate that the aforementioned examples are illustrative and not limiting.

Example Computing Systems

FIG. 4 is a block diagram of an example computer system 400, consistent with embodiments of the present disclosure. Components of system 100, such as entity resolution system 120, and client computing device 110, can include the architecture based on or similar to that of computer system 400.

As illustrated in FIG. 4, computer system 400 can include a bus 402 or other communication mechanism for communicating information, and one or more hardware processors 404 (denoted as processor 404 for purposes of simplicity) coupled with bus 402 for processing information. Hardware processor 404 can be, for example, one or more general-purpose microprocessors or it can be a reduced instruction set of one or more microprocessors.

Computer system 400 also includes a main memory 406, such as a random access memory (RAM) or other dynamic storage device, coupled to bus 402 for storing information and instructions to be executed by processor 404. Main memory 406 (e.g., computer readable storage medium) also can be used for storing temporary variables or other intermediate information during execution of instructions to be executed by processor 404. Such instructions, after being stored in non-transitory storage media accessible to processor 404, render computer system 400 into a special-purpose machine that is customized to perform the operations specified in the instructions.

Computer system 400 further includes a read only memory (ROM) 408 or other static storage device (e.g., a computer readable storage medium) coupled to bus 402 for storing static information and instructions for processor 404. A storage device 410, such as a magnetic disk, optical disk, or USB thumb drive (Flash drive), other computer readable storage medium, etc. is provided and coupled to bus 402 for storing information and instructions.

Computer system 400 can be coupled via bus 402 to an output device 412, such as a cathode ray tube (CRT), liquid crystal display, or touch screen, for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on output device 412. The input device typically has two degrees of freedom in two axes, a first axis (for example, x) and a second axis (for example, y), that allows the device to specify positions in a plane. In some embodiments, the same direction information and command selections as cursor control can be implemented via receiving touches on a touch screen without a cursor.

Computing system 400 can include a user interface module to implement various graphical user interfaces (as described herein) that can be stored in a mass storage device (e.g., a computer readable storage medium) as executable software codes (e.g., computer readable program instructions) that are executed by the one or more computing devices.

Computer system 400 can implement the techniques described herein using customized hard-wired logic, one or more ASICs or FPGAs, firmware and/or program logic which in combination with the computer system causes or programs computer system 400 to be a special-purpose machine. According to some embodiments, the operations, functionalities, and techniques and other features described herein are performed by computer system 400 in response to processor 404 executing one or more sequences of one or more instructions (e.g., computer readable program instructions) contained in main memory 406. Such instructions can be read into main memory 406 from another storage medium, such as storage device 410. Execution of the sequences of instructions contained in main memory 406 causes processor 404 to perform the process steps described herein. In alternative embodiments, hard-wired circuitry can be used in place of or in combination with software instructions.

Various forms of media can be involved in carrying one or more sequences of one or more instructions to processor 404 for execution. For example, the instructions can initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 can optionally be stored on storage device 410 either before or after execution by processor 404.

Computer system 400 can also include a network interface 418 coupled to bus 402. Network interface 418 can provide a two-way data communication coupling to a network link 420 that can be connected to a local network 422. For example, network interface 418 can be an integrated services digital network (ISDN) card, cable modem, satellite modem, or a modem to provide a data communication connection to a corresponding type of telephone line. As another example, network interface 418 can be a local area network (LAN) card to provide a data communication connection to a compatible LAN. Wireless links can also be implemented. In any such implementation, network interface 418 can send and receives electrical, electromagnetic, or optical signals that carry digital data streams representing various types of information.

Network link 420 can typically provide data communication through one or more networks to other data devices. For example, network link 420 can provide a connection through local network 422 to a host computer 424 or to data equipment operated by an Internet Service Provider (ISP) 426. ISP 426 in turn can provide data communication services through the world wide packet data communication network now commonly referred to as the "Internet" 428. Local network 422 and Internet 428 can both use electrical, electromagnetic or optical signals that carry digital data streams. The signals through the various networks and the signals on network link 420 and through network interface 418, which carry the digital data to and from computer system 400, can be example forms of transmission media.

Computer system 400 can send messages and receive data, including computer readable program instructions (e.g., program code), through the network(s), network link 420 and network interface 418. In the Internet example, a server 430 can transmit a requested code for an application program through Internet 428, ISP 426, local network 422 and network interface 418. The received code can be executed by processor 404 as it is received, and/or stored in storage device 410, or other non-volatile storage for later execution. In some embodiments, server 430 can provide information for being displayed on a display.

Example Methods of Entity Resolution

Figure 5:
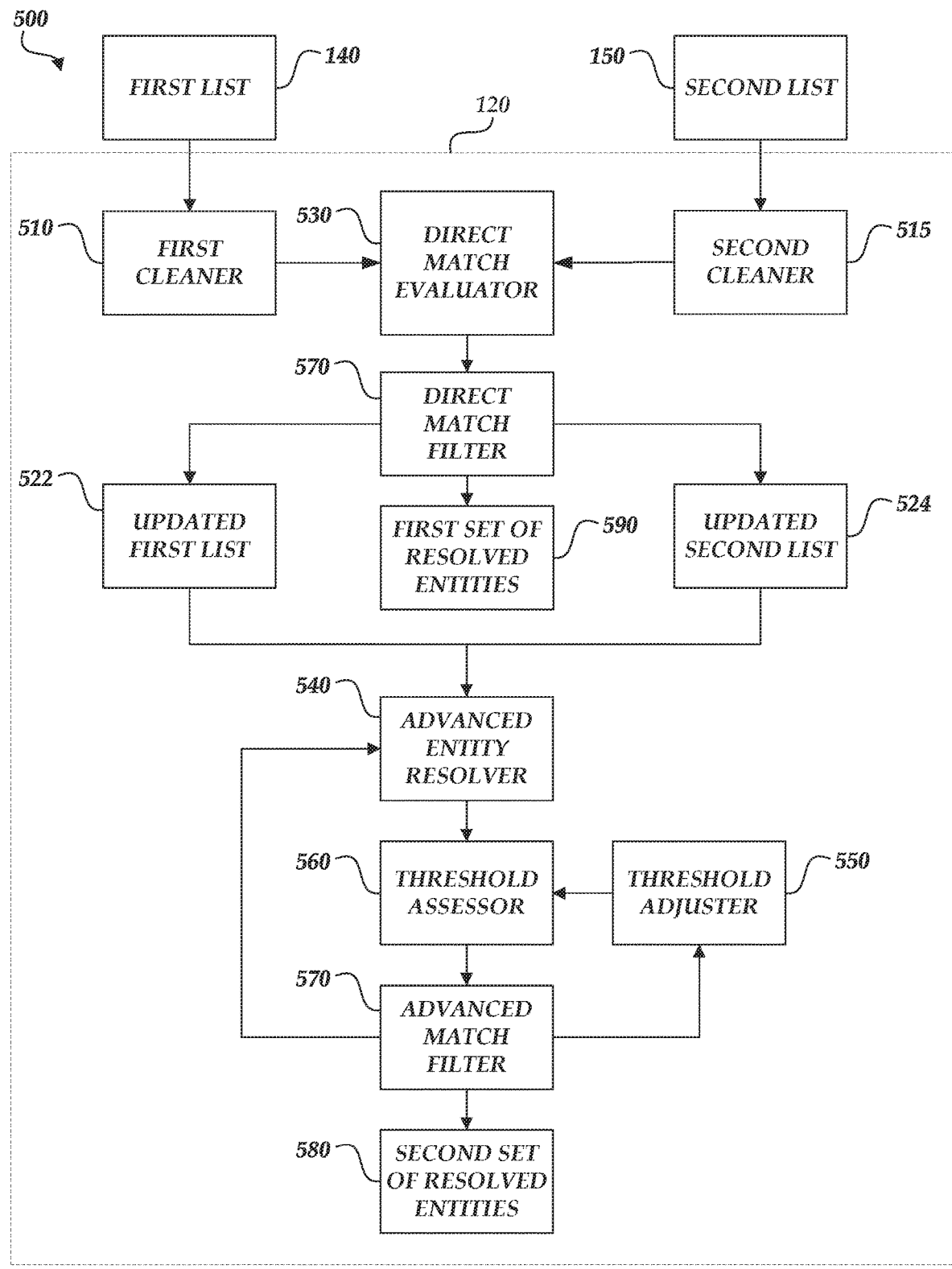
FIG. 5 is a block diagram representing an example process for resolving records associated with common entities across multiple lists, consistent with embodiments of the present disclosure.

FIG. 5 shows a block diagram 500 representing an example process for resolving records associated with common entities (e.g., company names) across multiple lists, consistent with embodiments of the present disclosure. The dotted region, labeled 120, represents an example entity resolution system (e.g., entity resolution system 120 in FIG. 1). The example process can acquire two lists on the order of millions or billions of records (e.g., first list 140 and second list 150) and determine whether records in each list are related.

The process can be used for at least one of data enrichment, data integration, or data deduplication. Data enrichment refers to processes used to enhance, refine, or otherwise improve raw data. Data integration involves combining data residing in different sources and providing users with a unified view of these data. Data deduplication refers to determining whether a particular list has duplicate entries. While FIG. 5 provides an example process flow for some embodiments of the present disclosure, it should be recognized by a person of skill in the art that not all steps need to be taken and that there can be additional steps.

A. Examples of Cleaners and Blockers

As shown in FIG. 5, entity resolution system 120 can receive first list 140 and second list 150, which were described above in reference to FIGS. 1-3. Entity resolution system 120 can then process first list 140 using a first cleaner 510 and a blocker (not shown).

First cleaner 510 can apply one or more cleaning functions to first list 140. Example cleaning functions can include making alphanumeric characters in each field lowercase, taking out punctuation from a field, taking out all numbers in a field, taking out everything but the numbers in the field, or switching "Corp" for "Corporation" or vice versa. Cleaning functions can be applied to the data in one or more fields in each record of first list 140. The cleaning functions can be used to normalize all of the records so that other functions can be more easily applied to first list 140. One or more cleaning functions can be chosen or determined automatically, by a user, or a combination thereof. The term "cleaning" or "cleansed" is a broad term and are entitled to their ordinary and customary meaning in the art without being limited a specific embodiment.

To illustrate the application of a particular cleaning function, a field can comprise a company's phone number of (987) 654-3210. A cleaning function can be applied to the field that would only keep the numbers, resulting in the field comprising 9876543210. Thus, when this field is compared with another field that has a similar cleaning function applied to it, there will only be numbers to compare. Another cleaning function that can be applied would be to add a number in front of the phone number. An example would be adding the number 1. The result of this cleaning function would be the field comprising 19876543210.

As shown above, after a cleaning function is applied, the data in the record of first list 140 can be altered by the cleaning function. In some embodiments, the data in the record of first list 140 will not be altered directly; but instead, either indicate that such cleaning function should be applied to the particular one or more fields in the future or associate the cleaned field with the original field in the first list 140. In some embodiments, the data in the record of first list 140 will not be altered at all; but instead, a new list will be created that includes the records with the cleaned fields. It will be understood by those skilled in the art that first cleaner 510 and second cleaner 515 may be bypassed, wherein first list 140 and second list 150 are fed directly into the direct match evaluator 230 described below. In some embodiments, the data from first list 140 may be additionally conditioned by one or more blockers (not shown) wherein the blockers may group or assign certain data entries in first list 140 based on, for example, information contained in various fields, such that those entries, groups or assignments are not considered by entity resolution system 120 thereafter. It will be understood that a blocker, if utilized in the system, may be implemented before, after, or in lieu of first or second cleaners 510, 515.

Entity resolution system 120 can also process second list 150 using a second cleaner 515 and a second blocker (not shown), which can provide similar functionality as those described above for first cleaner 510 and the first blocker described. While second cleaner 515 and the one or more blockers can provide similar functionality (e.g., cleaning and blocking), the application of that functionality may be different and may depend on how the data is stored in the fields of second list 150. For example, the field comprising (987) 654-3210 in first list 140 may be represented as 19876543210 in second list 150. For purposes of matching the data in the fields, it may be appropriate to clean or format the data so that the formatting of the data is consistent across both lists. If the desired end result is to compare a string of ten numbers, the field comprising (987) 654-3210 would need to have a cleaning function that removes everything but the numbers and the field comprising 19876543210 would need a cleaning function that removes the 1 from the front of the number.

Moreover, while FIG. 5 depicts two cleaners, it is appreciated that only one cleaner may be used, wherein the cleaner may apply different rules based on whether cleaning the first list 140 or the second list 150. It is also appreciated that entity resolution system 120 does not require one or more cleaners if the formatting of data between first list 140 and second list 150 are consistent. Moreover, it is appreciated that cleaning can take place after blocking and before entering the direct match evaluator 120.

B. Examples of Direct Match Evaluation

First list 140 and second list 150 are provided to direct match evaluator 530. Direct match evaluator 530 can reduce the number of comparisons necessary to determine if two records are related to a similar entity by reducing the number of relevant records, as discussed below. The direct match evaluation may be done before, after, or in lieu of being cleaned by first or second cleaner 510, 515.

In some implementations, the direct match evaluator 530 may apply techniques such as generating candidate pairs of records. For example, the direct match evaluator 530 may perform more matching operations based on direct matches for a single field/key. Additionally, records may be grouped based on matches between two or more fields. An example of an assignment to a group based on more than one field would be as follows. The assignment can be based on both the company name and address. In this example, a record would only be put into a group with another record if both records have the same company name and address. In some embodiments, assignments can be based on a portion of a field. For example, an assignment to a group can be based on the first three numbers of a zip code. Thus, every record with the same first three numbers would be assigned to a particular group. The group having the assigned records can be defined by a new list having those assigned records or by a number of pointers or other associations linking those assigned records to the group.

In one embodiment, direct match evaluator 530 performs a comparison of one or more data entries from second list 150 with the entirety of, or a predetermined subset of, first list 140. For example, direct match evaluator 530 may perform a character-by-character comparison for a data entry in order to determine whether a string of characters from a data entry in second list 150 matches another string of characters relating to a data entry in first list 140. For example, the data entry may be the company's name. In this example, if the name of a record in first list 140 directly matches the name of another record in first list 140, the direct match evaluator 530 would indicate that there was a direct match between the two records (i.e., a direct field). It should be understood that direct match and direct field are broad terms and should be given their ordinary and customary meaning without being limited to a specific embodiment.

In one embodiment, the direct match entries may be used to update first list 140 or second list 150 directly with, for example, a temporary indicator that a direct match was found for the one or more data entries. In another embodiment, first list 140 and second list 150 may be updated to completely remove the direct match entries from one or both lists (not shown). In another embodiment, direct match evaluator 530 may employ a direct match filter 570 to channel direct matches to a separate storage location. For example, a first set of resolved entities 590 may be created based on the direct matches found between entries from second list 150 and entries from first list 140, as shown. Accordingly, the first set of resolved entities 590 may contain those entries that were found to be a direct match.

However, if a record does not have a direct match, direct match evaluator 530 would indicate that no record in first list 140 directly matches the one or more data entries from second list 150 being compared. In one embodiment, updated first list 522 and updated second list 524 may be created for those unmatched entries. Accordingly, the remaining unmatched entries may be added to updated first list 522 and updated second list 524 for further resolution processing.

C. Examples of Advanced Entity Resolution

In various scenarios, simple and advanced techniques applied by the cleaners, blockers, and direct match evaluator 530 may group records where the relationship among the records is weak, and/or may not group records that should be grouped. Thus, in some embodiments, as illustrated by blocks 540, 550, 560, and 570 of FIG. 5, the system includes methods for performing advanced entity resolution, threshold assessment and adjustments, and advanced match filtering. Efficiently accomplishing this is difficult because of the magnitude of the combinations of keys/fields and paths by which records may be grouped. In some embodiments, assignments can be based on fuzzy matching between one or more fields. For convenience, the techniques applied by advanced entity resolver of the present disclosure may be referred to herein as "fuzzy name matching" and "fuzzy keyword matching."

In one embodiment, the updated first list 522 and updated second list 524 may be resolved through the use of fuzzy name matching and/or fuzzy keyword matching. For example, fuzzy name matching may identify a column of updated first and second list 522, 524 that contains entity name information. Advanced entity resolver 540 may compute a variety of string, set, and map comparators, as well as most common longest words, string lengths, etc., as described with reference to FIG. 7. The result of the computation may be a "likeness" score between two or more data entries. Similarly, advanced entity resolver 540 may perform fuzzy keyword matching on the data entries in order to compute a "likeness" score between two or more data entries and a keyword. Accordingly, the likeness score may correspond to the probability that an entry from updated second list 524 refers to the same entity as an entry from updated first list 522. If the likeness score or probability match is above a certain empirical value threshold, then the entries may be resolved, as further described below.

In some embodiments, the scoring techniques may be employed by a machine learning algorithm. For example, the machine learning technique may identify a record pair that the model assigns a match probability between 70% and 80%. Based on the current threshold value, advanced match filter 570 may compare the probability or likeness score against the threshold value.

D. Examples of Threshold Assessments and Adjustments thereof

In some implementations, the threshold may be improved on an ongoing basis, for example in an iterative or cascading fashion. Initially, an arbitrary threshold may be set that identifies a value for which the likeness score would be compared against. For example, threshold assessor 560 may select an initial arbitrary threshold value. In some instances, the initial arbitrary threshold value may be based on empirical data. In some instances, the initial arbitrary threshold may be set arbitrarily high such that it may be lowered upon additional iterations. However, the threshold value may be adjusted based on the results of each advanced entity resolver 540 iteration, as further described below.

For example, if the likeness score obtained from advanced entity resolver 540 for a particular entry in updated second list 524 is below the threshold, then advanced match filter 570 would retain that data entry and send the entry back through advanced entity resolver 540. In addition, advanced match filter may send matching probability information to threshold adjuster 550. Threshold adjuster 550 may adjust the threshold based on, for example, a data distribution curve illustrating the distribution of entries and their associated match probability. For example, the data distribution curve may contain data indicating the match probability of the entries that have been not yet been resolved and thus, remain after the resolved entities have been filtered from the respective lists. Adjusting the threshold may be based on any number of different metrics obtained from the data distribution curve including the standard deviation, mean, mode, or any combination of these metrics.

The threshold may be adjusted based on, for example, a machine learning algorithm. Threshold adjustment models can be generated, trained, evaluated, validated, and improved in a trainer/evaluator/validator based on one or more machine learning techniques and based on a portion or all of the data distribution observed for the output of advanced entity resolver 540. The threshold adjustment models may also be referred to herein as machine learning models. In some embodiments a threshold adjustment model may be a statistical model.

The threshold adjustment models may be generated based on machine learning techniques that can be supervised, semi-supervised, or unsupervised machine learning techniques, or some combination thereof. For example, the threshold adjustment models may be initially trained based on a permissive model, may be improved through automatic and/or manual feedback, may be evaluated and validated using various criteria and via user interfaces, and the like.

E. Examples of Advanced Match Filtering

After the assessment in threshold assessor 560, the pairs with the scores can be filtered in advanced match filter 570. Filtering can distinguish pairs that have a match probability above a certain threshold. Distinguishing the pairs can include indicating in the records that they are associated with other records. Distinguishing can also include gathering the pairs that have a match probability above a certain threshold in a data structure. The threshold can be user specified or automatically generated based on the output of advanced match filter 570 and threshold adjuster 550.

After the pairs are distinguished in advanced match filter 570, advanced match filter 570 can provide a result based on the filtering. The result can be provided in a number of ways, for example, such as showing one or more matching records, a probability that the pair is associated with the same entity, or any combination thereof. The result can then be recorded as a second set of resolved entities 580. Accordingly, the data entries that did not surpass the threshold at threshold assessor 560 may be retained as part of updated second list 524 and sent back through advanced entity resolver 540 for further matching. In some embodiments, the threshold adjuster 550 may adjust the threshold value based on data distribution for those entries that were rejected by threshold assessor 560 such that when those entries are subsequently rerouted to advanced entity resolver 540, they will need to satisfy a adjusted threshold bar so as to be acceptable for resolving in second set of resolved entities 580.

In one embodiment, threshold adjuster may continuously adjust the threshold (in most instances, by lowering the threshold bar at each pass) based on the data output of advanced match filter 570. For example, advanced match filter 570 may allow data entries that are above the current threshold value to pass on to second set of resolved entities 580.

The result of advanced match filter 570 can be used to resolve matching entities. Resolving matching entities may comprise combining records that are associated with the same records. Resolving matching entities can also comprise grouping matching records into clusters by passing the results of advanced match filter 570 to a cluster generator (not shown). In various implementations, the system may include one or more cluster generators that may be executed in parallel or serially, in any combination.

Example Methods of Resolving Common Entities

Figure 6:
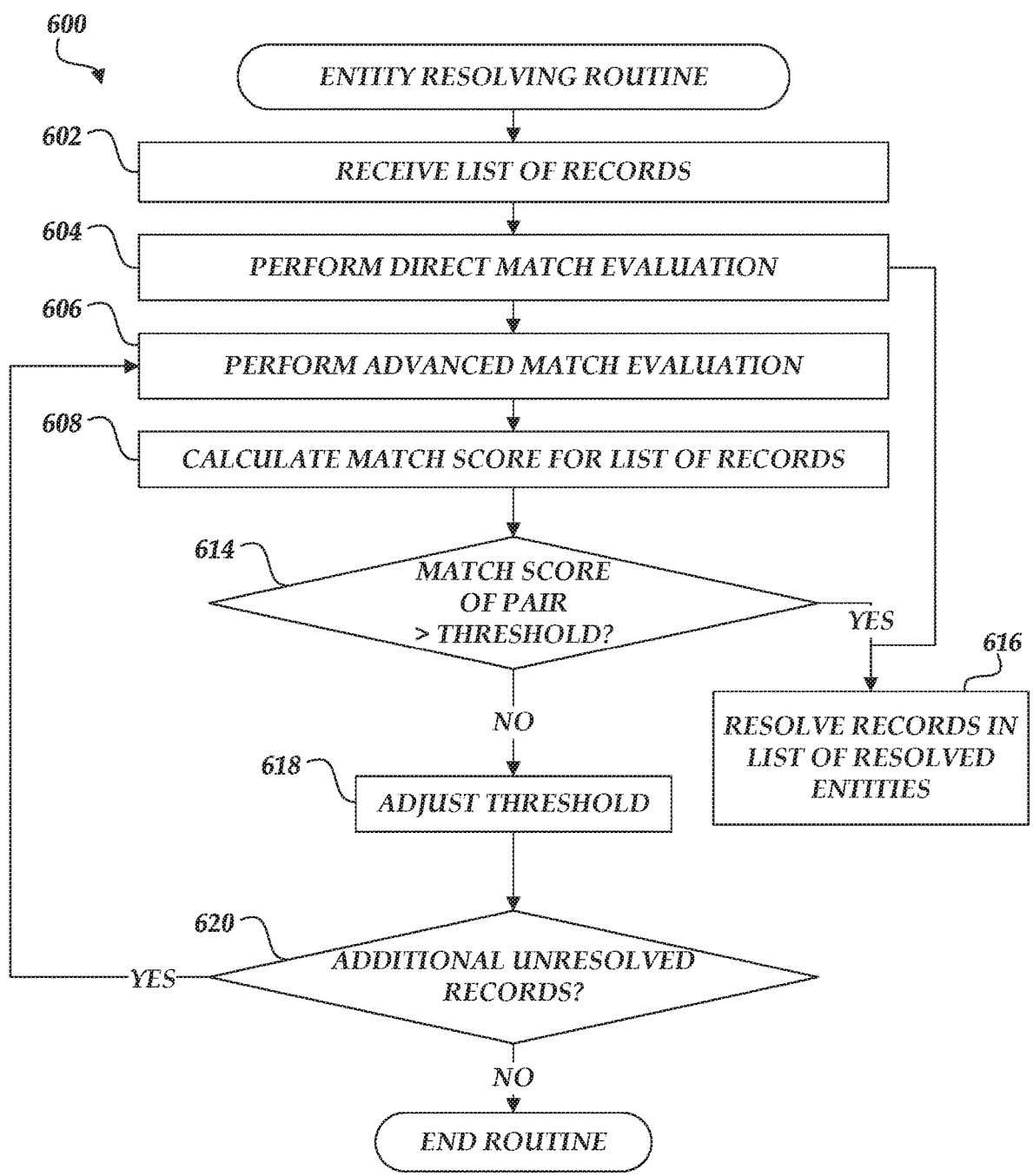
FIG. 6 is a flowchart representing an example method for resolving records associated with common entities across multiple lists, consistent with embodiments of the present disclosure.

FIG. 6 is a flowchart representing an example routine 600 for resolving records that refer to common entities (e.g., company names), consistent with embodiments of the present disclosure. While the flowchart discloses the following steps in a particular order, it will be appreciated that at least some of the steps can be moved, modified, or deleted where appropriate, consistent with the teachings of the present disclosure. The resolving steps can be performed in full or in part by an entity resolution system (e.g., entity resolution system 120), illustratively by carrying out a process such as the process illustrated in FIG. 5. It is appreciated that some of these steps can be performed in full or in part by other components (e.g., such as client computing device 110 identified above in FIG. 1).

At block 602, one or more lists of records may be received. The received list of records may illustratively be first list 140, second list 150, or in some embodiments both lists. The received list or lists may each comprise a plurality of records, with each record comprising one or more fields.

At block 604, the list of records from first list 140, second list 150, or in some embodiments both lists may be reduced after performing a direct match evaluation. For example, records from second list 150 may be compared against first list 140 to determine whether any direct matches were present. Those direct matches would then be removed from one or both lists with the result being updated first list 522, updated second list 524, or both updated lists 522, 524. Accordingly, the original lists may be reduced or updated to include only those records that were not a direct match. The subset of records may then undergo further processing with more advanced entity resolution techniques, in accordance with the disclosure herein. Additionally, a subset of records may be identified from the list or lists that were not found to be a direct match at block 604. Accordingly, one or more updated lists may be generated based on the records that were not found to have a direct match with the direct match results being removed from the updated lists. The results that were found to be a direct match may be grouped to inform the first set of resolved records. A set of resolved entities may then be obtained from those data entries that were found to be a direct match at block 604 as shown at block 616.

At block 606, the unresolved records within the incoming two or more lists may be further resolved by an advanced match evaluation. In some embodiments, the matching may be based on a product of, for example, a levenshtein calculation, a longest common substring calculation, a jaccard similarity and/or a cosine similarity ngram calculation, as described below with reference to FIG. 7. In some embodiments, the records may only contain those data entries that were unresolved by the direct match evaluation.

Thereafter, at block 608, a match score may be calculated for the records contained in the incoming two or more lists. Match scores may be calculated, for example, using fuzzy keyword searching or fuzzy name searching as described above. The match score may illustratively indicate a probability that the name from separate lists both refer to the same entity and in this way, may be resolved. For example, match score may be determined indicating, for example, an 85% probability that both records refer to a same company name. A match score may be determined for each comparison conducted between each data entry across the two or more lists.

Match scores may be determined based on a field or fields corresponding to the entity. For example, the entity may be a company type or a revenue stream, and the records may contain one or more fields corresponding to the entity. Match scores may further be determined based on a field or fields that do not directly correspond to the entity. For example, the records may each contain a field indicating a revenue stream, and a match score for the company name may be determined based on the similarity of the revenue stream.

At decision block 614, the match score output of the advanced match evaluation may be evaluated to determine whether the match score exceeds a threshold. The initial threshold may be arbitrarily chosen based on, for example, user input, previous executions of the entity resolving routine 600, or other criteria. For example, a match may be 0.3, indicating a 30% probability that two records from separate lists refer to the same company within a canonical data set.

If the candidate pair has a match score exceeding the threshold, then the routine 600 branches to block 616 and the candidate pair is added to the resolved records list containing the resolved entities. At block 616, the resolved records obtained from the direct match evaluation of block 604 may be concatenated with the next set of resolved records obtained from the advanced match evaluations. If the match score does not exceed the threshold, then routine 600 proceeds to decision block 618, where the threshold may be adjusted, for example, downward for the next iteration of advanced matching.

At block 618, a determination is made as to what the value of the threshold should be. In some embodiments, the threshold value is adjusted based on an evaluation of a data distribution curve generated based on the unmatched or unresolved records from block 614.

If there are remaining unresolved records, then the routine 600 branches to decision block 606, where a further advanced evaluation matching is performed on the remaining records. If there are no remaining unresolved records, the routine ends.

One skilled in the art will appreciate that the entity resolving routine 600 may end once a certain number of entity matches are unresolved. For example, a stop limit may be placed on lowering the threshold value such that once the threshold was below a certain value, the routine would stop and the remaining unresolved entities would be discarded from the list entirely. One skilled in the art will further appreciate that the blocks of routine 600 are illustrative and may be combined or carried out in different orders. For example, in some embodiments, the determination of whether there are additional unresolved records at block 620 may be performed before adjusting the threshold at block 618. In further embodiments, block 616 may be omitted or deferred. The routine depicted in FIG. 6 is thus understood to be illustrative and not limiting, and the present disclosure is understood to include other resolving algorithms beyond the specific example depicted.

Figure 7:
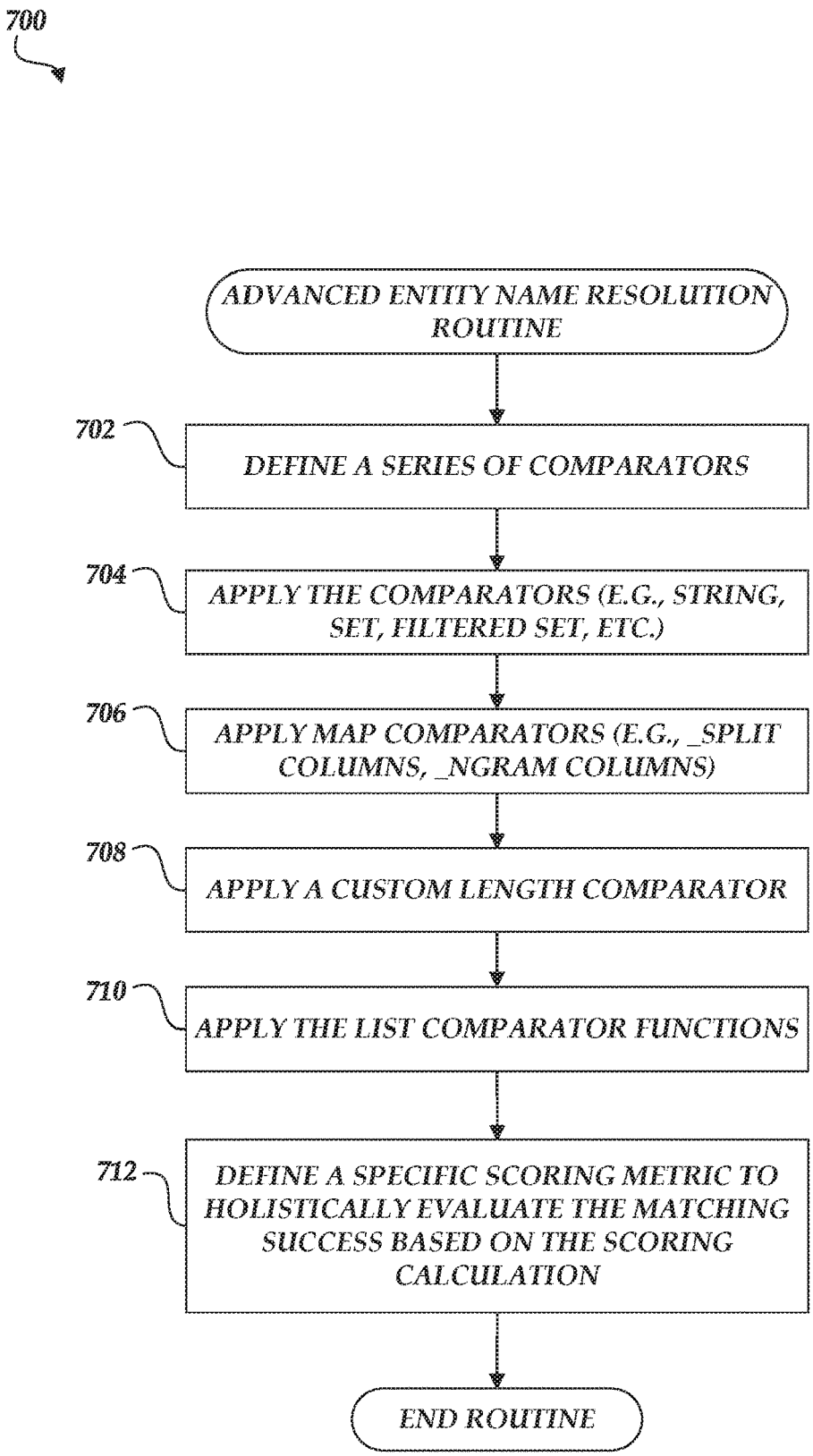
FIG. 7 is a flowchart representing an example method involving advanced entity resolution, consistent with embodiments of the present disclosure.

FIG. 7 is an example data distribution chart that may contain data results and distribution from one or more iterations of advanced entity resolution routine. Further, the data distribution graph may be leveraged in order to determine how the threshold should be adjusted for the next iteration of entity resolution. While the chart discloses a particular form of data visualization, it will be appreciated that the data distribution may be presented in a number of different formats. The data distribution graph or chart may be generated in full or in part by an entity resolution system (e.g., entity resolution system 120). It is appreciated that some of the data distribution analytics can be performed in full or in part by other components (e.g., such as client computing device 110 identified above in FIG. 1).

Example Methods of Advanced Entity Name Resolution

FIG. 7 is a flowchart representing an example routine 700 for advanced entity name resolution of records associated with a canonical company name, consistent with embodiments of the present disclosure. While the flowchart discloses the following steps in a particular order, it will be appreciated that at least some of the steps can be moved, modified, or deleted where appropriate, consistent with the teachings of the present disclosure. The routine 700 can be performed in full or in part by an entity resolution system (e.g., entity resolution system 120). It is appreciated that some of these steps can be performed in full or in part by other components (e.g., such as client computing device 110 identified above in FIG. 1).

At block 702, advanced entity resolver 540 may first define a series of comparators. For example, the defined series of comparators may include string comparators, map comparators, set comparators, and/or filtered set comparators. Examples of these types of comparators include the following: a normalized Levenshtein similarity, a jaccard similarity, a cosine similarity, a longest common substring, a dice coefficient similarity, an overlap coefficient, and/or Euclidian distance comparators.

At block 704, advanced entity resolver 540 may then apply the string comparators. For example, the string comparators may include the normalized levenshtein similarity and the longest common substring. The Levenshtein comparator is a string metric for measuring the difference between two sequences. For example, the Levenshtein distance between two words may be the minimum number of single-character edits (e.g., insertions, deletions or substitutions) required to change one word into the other.

At block 706, advanced entity resolver 540 may then apply map comparators. For example, the map comparators may include applying the map comparators on columns that have undergone a "_split" function and/or an "ngram" function.

At block 708, advanced entity resolver 540 may apply a custom length comparator. For example, the custom length comparator may be a certain number of characters from the right or from the left that would be included as part of the scoring algorithm.

At block 710, advanced entity resolver 540 may apply the list comparator functions. For example, the list may include an average, a minimum, a maximum, or a sum comparator. Advanced entity resolver 540 may apply the list comparator functions to a single data entry in the second list, for example, and compare the data entry to each data entry located in the first list.

At block 712, advanced entity resolver 540 may define a specific scoring metric to holistically evaluate the matching success. For example, the scoring metric may be based on the product of a number of comparators. In a non-limiting example, the scoring metric may be based on a levenshtein normal comparator, a least common substring comparator, a jaccard similarity comparator, and a cosine similarity ngram comparator. At block 712, the calculated score may be output, illustratively to the threshold assessor of FIG. 5. One skilled in the art will appreciate that the examples of the present disclosure are illustrative rather than limiting.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program. In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system comprising:
   a plurality of processors;
   at least one storage device configured to store data; and
   a network communication interface configured to receive
      a request from a remote device to perform a processing operation on a first portion of the data;
   wherein the system is configured to:
      access first data of a first data store of the storage device, wherein the first data comprises a first plurality of entity entries;
      access second data from a second data store, wherein the second data comprises a second plurality of entity entries, wherein each entry of the first plurality of entity entries and the second plurality of entity entries comprises a plurality of fields;
      identify, from the first plurality of entity entries and the second plurality of entity entries, a first set of resolved entities based on a direct field;
      determine, from the first set of resolved entities, updated first data and updated second data;
      identify a second set of resolved entities based on the updated first data and the updated second data by performing an iterative fuzzy match, wherein a match threshold is adjusted between iterations of the iterative fuzzy match based on a data distribution curve illustrating match probabilities of unresolved pairs of entities among the updated first data and the updated second data; and
      transmit the first set of resolved entities and the second set of resolved entities to a computing device.

2. The system of claim 1, wherein the first data is cleansed prior to identifying the direct field.

3. The system of claim 2, wherein the second data is cleansed prior to identifying the direct field.

4. The system of claim 2, wherein cleansing the data comprises formatting at least one field of the plurality of entity entries.

5. The system of claim 1, wherein determining the updated first data comprises removing, from the first data, entries corresponding to the first set of resolved entities.

6. The system of claim 1, wherein determining the updated second data comprises removing, from the second data, entries corresponding to the first set of resolved entities.

7. The system of claim 1, wherein one or more iterations of the iterative fuzzy match comprises:
   executing a comparison using a plurality of string comparators on a first field from the updated first data and a second field from the updated second data;
   determining a metric based on the comparison; and
   determining the metric exceeds the match threshold.

8. The system of claim 7, wherein the match threshold is adjusted based at least in part on a metric obtained from the data distribution curve, wherein the metric obtained from the data distribution curve is based on a standard deviation, mean, or mode of the data distribution curve.

9. The system of claim 7, wherein the string comparators include map comparators and/or string comparators.

10. The system of claim 7, wherein determining the metric is based at least in part on calculating a product of a levenshtein distance calculation, a least common substring calculation, a jaccard similarity calculation, and a cosine similarity ngram calculation.

11. The system of claim 1, wherein the remote device comprises the computing device.

12. A method comprising:
   accessing first data of a first data store of the storage device, wherein the first data comprises a first plurality of entity entries;
   accessing second data from a second data store, wherein the second data comprises a second plurality of entity entries, wherein each entry of the first plurality of entity entries and the second plurality of entity entries comprises a plurality of fields;
   identifying, from the first plurality of entity entries and the second plurality of entity entries, a first set of resolved entities based on a direct field;
   determining, from the first set of resolved entities, updated first data and updated second data;
   identifying a second set of resolved entities based on the updated first data and the updated second data by performing an iterative fuzzy match, wherein a match threshold is adjusted between iterations of the iterative fuzzy match based on a data distribution curve illustrating match probabilities of unresolved pairs of entities among the updated first data and the updated second data; and
   transmitting the first set of resolved entities and the second set of resolved entities to a computing device.

13. The method of claim 12, wherein the first data is cleansed prior to identifying the direct field.

14. The method of claim 12, wherein cleansing the data comprises formatting at least one field of the plurality of entity entries.

15. The method of claim 12, wherein identifying the second set of resolved entities comprises:
   executing a first comparison using a plurality of string comparators on a first field from the updated first data and a second field from the updated second data;
   determining a metric based on the comparison; and
   determining the metric exceeds the match threshold.

16. The method of claim 15, wherein identifying the second set of resolved entities further comprises:
   determining that one or more metrics did not exceed the match threshold;
   generating the data distribution curve comprising distribution data based on the one or more metrics; and
   adjusting the match threshold based on the data distribution curve.

17. The method of claim 16, wherein identifying the second set of resolved entities further comprises:
   executing a second comparison on the entities with metrics that did not exceed the initial match threshold;
   determining a new metric based on the second comparison; and
   determining the new metric exceeds the adjusted match threshold.

18. A non-transitory computer-readable storage medium including computer-executable instructions that, when executed by a processor, cause the processor to:
   access first data of a first data store of the storage device, wherein the first data comprises a first plurality of entity entries;
   access second data from a second data store, wherein the second data comprises a second plurality of entity entries, wherein each entry of the first plurality of entity entries and the second plurality of entity entries comprises a plurality of fields;
   identify, from the first plurality of entity entries and the second plurality of entity entries, a first set of resolved entities based on a direct field;
   determine, from the first set of resolved entities, updated first data and updated second data;
   identify a second set of resolved entities based on the updated first data and the updated second data by performing an iterative fuzzy match, wherein a match threshold is adjusted between iterations of the iterative fuzzy match based on a data distribution curve illustrating match probabilities of unresolved pairs of entities among the updated first data and the updated second data; and
   transmit the first set of resolved entities and the second set of resolved entities to a computing device.

19. The non-transitory computer-readable storage medium of claim 18, wherein the computer-executable instructions further cause the processor to, for one or more iterations of the iterative fuzzy match:
   execute a comparison using a plurality of string comparators on a first field from the updated first data and a second field from the updated second data;
   determine a metric based on the comparison; and
   determine the metric exceeds the match threshold.

* * * * *